(12) United States Patent
Freeman et al.

(10) Patent No.: US 12,066,633 B2
(45) Date of Patent: *Aug. 20, 2024

(54) WEARABLE PUPIL-FORMING DISPLAY APPARATUS

(71) Applicant: Raytrx, LLC, Tulsa, OK (US)

(72) Inventors: Michael H. Freeman, Tulsa, OK (US); Jordan Boss, Tulsa, OK (US); Mitchael C. Freeman, Tulsa, OK (US); Behnam Rafiee, Tulsa, OK (US); Andrew Mourn, Elbert, CO (US); David Kessler, Rochester, NY (US); Steven Yeager, Tulsa, OK (US)

(73) Assignee: RAYTRX, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,727

(22) Filed: Mar. 7, 2023

(65) Prior Publication Data

US 2023/0333385 A1    Oct. 19, 2023

Related U.S. Application Data

(63) Continuation of application No. 17/747,465, filed on May 18, 2022, now Pat. No. 11,624,928, which is a (Continued)

(51) Int. Cl.
G02B 27/01    (2006.01)
G02B 7/12    (2021.01)
(Continued)

(52) U.S. Cl.
CPC .......... G02B 27/0172 (2013.01); G02B 7/12 (2013.01); G02B 27/0176 (2013.01); (Continued)

(58) Field of Classification Search
CPC .............. G02B 27/0093; G02B 27/017; G02B 27/0172; G02B 27/0176; G02B 30/35; G02B 2027/0118; G02B 2027/013; G02B 2027/0134; G02B 2027/0138; G02B 2027/0159; G02B 2027/0178; G02B 2027/011; G02B 7/12; G06T 7/50; G06F 3/013; G06F 3/011; G09G 3/007; G09G 2340/0407; G09G 3/002; G09G 3/2051; G09G 3/2055; H04N 5/247; H04N 9/3138; H04N 23/90
See application file for complete search history.

(56) References Cited

U.S. PATENT DOCUMENTS 3,614,456 A    10/1971    Hamisch
5,663,833 A    9/1997    Nanba et al.
(Continued)

*Primary Examiner* — Nitin Patel
*Assistant Examiner* — Cory A Almeida
(74) *Attorney, Agent, or Firm* — Howard & Howard Attorneys PLLC

(57) ABSTRACT

A wearable display apparatus is described herein. The wearable display apparatus includes a headset, a left-eye optical system, a right-eye optical system, and an inter-pupil distance (IPD) adjustment system coupled to the headset, the left-eye optical system, and the right-eye optical system for adjusting an inter-pupil spacing between the left-eye optical system and the right-eye optical system.

20 Claims, 32 Drawing Sheets

Related U.S. Application Data continuation of application No. 17/524,832, filed on Nov. 12, 2021, now Pat. No. 11,353,711, which is a continuation-in-part of application No. 17/496,102, filed on Oct. 7, 2021, now Pat. No. 11,353,710, which is a continuation of application No. 17/389,484, filed on Jul. 30, 2021, now Pat. No. 11,181,747, which is a continuation of application No. 17/139,167, filed on Dec. 31, 2020, now Pat. No. 11,112,611.

(60) Provisional application No. 63/060,343, filed on Aug. 3, 2020.

(51) Int. Cl.
  *G02B 30/35* (2020.01)
  *G06F 3/01* (2006.01)
  *G06T 7/50* (2017.01)
  *G09G 3/00* (2006.01)
  *G09G 3/20* (2006.01)
  *H04N 23/90* (2023.01)

(52) U.S. Cl.
  CPC ............. *G02B 30/35* (2020.01); *G06F 3/013* (2013.01); *G06T 7/50* (2017.01); *G09G 3/002* (2013.01); *G09G 3/007* (2013.01); *G02B 2027/011* (2013.01); *G02B 2027/013* (2013.01); *G02B 2027/0134* (2013.01); *G02B 2027/0138* (2013.01); *G02B 2027/0159* (2013.01); *G09G 3/2055* (2013.01); *G09G 2340/0407* (2013.01); *H04N 23/90* (2023.01)

(56) References Cited

U.S. PATENT DOCUMENTS

| | | | | |
|---|---|---|---|---|
| 6,084,715 | A | * | 7/2000 | Aoki ................... G02B 13/007 359/627 |
| 6,310,736 | B1 | | 10/2001 | Togino |
| 8,089,568 | B1 | | 1/2012 | Brown et al. |
| 10,732,407 | B1 | | 8/2020 | Wood et al. |
| 11,112,611 | B1 | | 9/2021 | Kessler |
| 11,181,747 | B1 | | 11/2021 | Kessler |
| 2006/0055886 | A1 | | 3/2006 | Cobb et al. |
| 2010/0109980 | A1 | * | 5/2010 | Tohara ............... G02B 27/0172 345/32 |
| 2010/0214635 | A1 | * | 8/2010 | Sasaki ................ G02B 27/0101 359/15 |
| 2013/0127980 | A1 | * | 5/2013 | Haddick ............ G02B 27/0093 348/14.08 |
| 2015/0070773 | A1 | | 3/2015 | Wang et al. |
| 2018/0003977 | A1 | * | 1/2018 | Mir .................... G02B 27/0176 |
| 2018/0039052 | A1 | | 2/2018 | Khan et al. |
| 2018/0284441 | A1 | | 10/2018 | Cobb |
| 2019/0018236 | A1 | * | 1/2019 | Perreault ................. G06F 3/013 |
| 2019/0219818 | A1 | | 7/2019 | Mattinson |
| 2019/0227319 | A1 | * | 7/2019 | Trail ................... G02B 6/12007 |
| 2019/0339528 | A1 | * | 11/2019 | Freeman ................ G06F 3/013 |

* cited by examiner

WEARABLE PUPIL-FORMING DISPLAY APPARATUS

CROSS REFERENCE TO RELATED APPLICATIONS

This application is a continuation of U.S. patent application Ser. No. 17/747,465, filed May 18, 2022, which is a continuation of U.S. patent application Ser. No. 17/524,832, filed Nov. 12, 2021 (now U.S. Pat. No. 11,353,711, issued Jun. 7, 2022), which is a continuation-in-part of U.S. patent application Ser. No. 17/496,102, filed Oct. 7, 2021 (now U.S. Pat. No. 11,353,710, issued Jun. 7, 2022), which is a continuation of U.S. patent application Ser. No. 17/389,484, filed Jul. 30, 2021 (now U.S. Pat. No. 11,181,747, issued Nov. 23, 2021), which is a continuation of U.S. patent application Ser. No. 17/139,167, filed Dec. 31, 2020 (now U.S. Pat. No. 11,112,611, issued Sep. 7, 2021), which claims the benefit of U.S. Provisional application Ser. No. 63/060,343, filed on Aug. 3, 2020, the disclosures of which are hereby incorporated by reference in their entirety and for all purposes.

TECHNICAL FIELD

The present disclosure generally relates to wearable display apparatus and more particularly to a wearable display device that provides augmented reality (AR), mixed reality (MR), and extended reality (XR) viewing (collectively herein "AR") with a catadioptric pupil-forming optical system that renders a binocular 3D virtual image from a pair of 2-dimensional (2D) displays.

BACKGROUND

Virtual image display has advantages for augmented reality (AR) presentation, including providing the capability for display of image content using a compact optical system that can be mounted on eyeglasses or goggles, generally positioned very close to the eye (Near-Eye Display) and allowing see-through vision, not obstructing the view of the outside world. Among virtual image display solutions for AR viewing are catadioptric optics that employ a partially transmissive curved mirror for directing image-bearing light to the viewer's eye and a partially reflective beam splitter for combining light generated at a 2D display with the real-world visible scene which forms a 3D image when viewed binocularly.

Vision correction applications have employed wearable display devices in order to enhance or compensate for loss of vision over portions of a subject's field of view (FOV). Support for these types of applications can require additional components and can introduce various factors related to wearability and usability that contribute to the overall complexity of the optical design and packaging.

Among challenges that must be addressed with wearable AR devices is obtaining sufficient brightness of the virtual image. Many types of AR systems, particularly those using pupil expansion, have reduced brightness and power efficiency. Measured in NITS or candelas per square meter ($Cd/m^2$), brightness for the augmented imaging channel must be sufficient for visibility under some demanding conditions, such as visible when overlaid against a bright outdoor scene. Other optical shortcomings of typical AR display solutions include distortion, reduced see-through transmission, small eye box, and angular field of view (FOV) constraints.

Some types of AR solution employ pupil expansion as a technique for enlarging the viewer eye-box. However, pupil expansion techniques tend to overfill the viewer pupil which wastes light, providing reduced brightness, compromised resolution, and lower overall image quality. Pupil expansion techniques also typically have small field-of-view attributes.

Challenging physical and dimensional constraints with wearable AR apparatus include limits on component size and positioning and, with many types of optical systems, the practical requirement for folding the optical path in order that the imaging system components be ergonomically disposed, unobtrusive, and aesthetically acceptable in appearance. Among aesthetic aspects, compactness is desirable, with larger horizontal than vertical dimensions.

Other practical considerations relate to positioning of the display components themselves. Organic Light-Emitting Diode (OLED) displays have a number of advantages for brightness and overall image quality, but can generate perceptible amounts of heat. For this reason, it is advisable to provide some distance and air space between an OLED display and the skin, particularly since it may be necessary to position these devices near the viewer's temples.

Still other considerations relate to differences between users of the wearable display, such as with respect to inter-pupil distance (IPD) and other variables related to the viewer's vision. Further, problems related to conflict between vergence depth and accommodation have not been adequately understood or addressed in the art.

It has proved challenging to wearable display designers to provide the needed image quality, while at the same time allowing the wearable display device to be comfortable and aesthetically pleasing and to allow maximum see-through visibility. In addition, the design of system optics must allow wearer comfort in social situations, without awkward appearance that might discourage use in public. Providing suitable component housing for wearable eyeglass display devices has proved to be a challenge, making some compromises necessary. As noted previously, in order to meet ergonomic and other practical requirements, some folding of the optical path along one or both vertical and horizontal axes may be desirable.

SUMMARY OF INVENTION

The Applicants address the problem of advancing the art of AR display and addressing shortcomings of other proposed solutions, as outlined previously in the background section.

The Applicants' solution uses pupil forming and can be distinguished from pupil expansion systems known to those skilled in the art. By comparison with pupil expansion approaches, the Applicants' approach yields a more efficient optical system with improved image quality. Moreover, the eyes of the viewer can clearly see and be seen by others, with minimal impediment from the optics that provide the electronically generated virtual image.

Wearable display apparatus of the present disclosure are well-adapted for systems that complement viewer capabilities, such as where a viewer may have visual constraints due to macular degeneration, low vision, or other condition of the eyes.

With these objects in mind, there is provided a wearable display apparatus comprising a wearable display apparatus comprising a headset that is configured for display from a left-eye optical system and a right-eye optical system, wherein each optical system defines a corresponding exit pupil for a viewer along a view axis and comprises: (a) an electroluminescent image generator that is energizable to direct image-bearing light for a 2D image from an emissive surface; (b) a curved reflective surface disposed along the view axis and partially transmissive, wherein the curved reflective surface defines a curved intermediate focal surface; (c) a beam splitter disposed along the view axis and oriented to reflect light toward the curved reflective surface; (d) an optical image relay that is configured to optically conjugate the formed 2D image at the image generator with the intermediate focal surface, wherein the optical image relay comprises: (i) a prism having an input surface facing toward the emissive surface of the image generator, an output surface facing toward the intermediate focal plane, and a folding surface extending between the input and output surfaces and configured for folding an optical path for light generated by the image generator, wherein an aperture stop for the relay lies within the prism; (ii) at least a first plano-aspheric lens in optical contact against the prism input surface and configured to guide the image-bearing light from the image generator toward the folding surface; wherein the relay, curved mirror, and beam splitter are configured to form the exit pupil for viewing the generated 2D image superimposed on a portion of a visible object scene, wherein combined images from both left- and right-eye optical systems form a 3D image for the viewer; and (e) a plurality of sensors coupled to the headset and configured to acquire measured data relating to the viewer.

According to an embodiment of the present disclosure, there is provided a wearable display apparatus comprising a headset that is configured for display from: (a) a left-eye optical system; (b) a right-eye optical system, wherein each optical system is a near-eye catadioptric pupil-forming optical system that defines a corresponding exit pupil for a viewer along a view axis and comprises: (i) an electroluminescent image generator that is energizable to direct image-bearing light for a 2D image from an emissive surface along an optical path; (ii) a curved reflective surface disposed along the view axis and partially transmissive, wherein the curved reflective surface defines a curved intermediate focal surface; (iii) a beam splitter disposed along the view axis and oriented to reflect light toward the curved reflective surface; (iv) an optical image relay that is configured to optically conjugate the formed 2D image at the image generator with a curved aerial image formed in air at the curved intermediate focal surface, wherein the optical image relay comprises: a prism having an input surface facing toward the emissive surface of the image generator, an output surface facing toward the curved intermediate focal surface, and a folding surface extending between the input and output surfaces and configured for folding the optical path for light generated by the image generator, wherein an aperture stop for the relay is formed within the prism; wherein the relay, curved mirror, and beam splitter are configured to form the exit pupil for viewing the generated 2D image superimposed on a portion of a visible object scene, wherein combined images from both left- and right-eye optical systems form a 3D image for the viewer; (c) a stationary circuit board that houses a first set of electronic components having a fixed position within the headset; (d) a movable circuit board that is mechanically coupled to a transport apparatus that is configured to impart movement to either the left-eye or right-eye optical system and that houses a second set of electronic components, wherein a flexible connection maintains signal communication between the movable circuit board and the first set of electronic components on the stationary circuit board; and (e) an actuator that is energizable to move the transport apparatus away from or toward the stationary circuit board according to viewer monitoring.

DETAILED DESCRIPTION

Figure 1B:
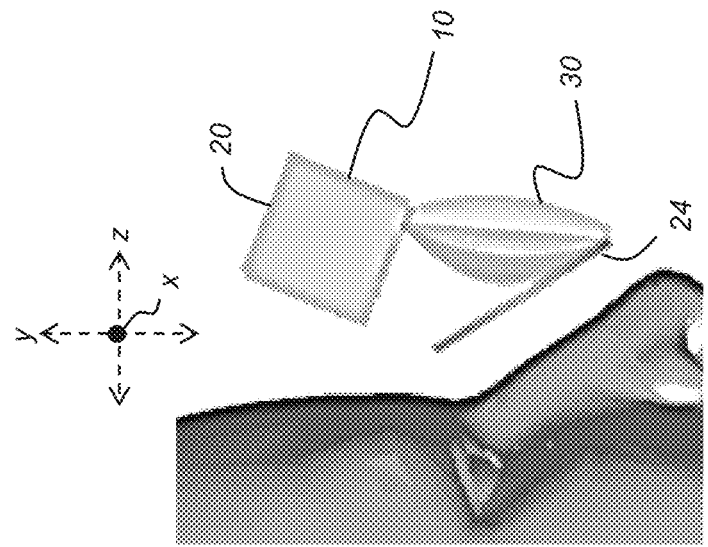
FIG. 1B is a schematic side view showing placement of optical components of the system.

The following is a detailed description of the preferred embodiments of the disclosure, reference being made to the drawings in which the same reference numerals identify the same elements of structure in each of the several figures.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification. It will be apparent to one having ordinary skill in the art that the specific detail need not be employed to practice according to the present disclosure. In other instances, well-known materials or methods have not been described in detail in order to avoid obscuring the present disclosure.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

In the context of the present disclosure, the term "eyebox" has its conventional meaning in the HMD arts, as functionally equivalent to "eye motion box" and similar phrases. The eyebox is that volume of space within which the viewable image is formed by an optical system or visual display. When the viewer's pupil is within this volume, the viewer can see all of the generated display content; with the pupil is outside of this volume, the user is typically not able to view at least some portion of the display content. A larger eyebox is generally desirable, as this allows for lateral and axial movement of the eye, while still maintaining a full field of view. The size of the eyebox relates directly to the size of the exit pupil for a display system.

Several (or different) elements discussed herein and/or claimed are described as being "coupled," "in communication with," "integrated," or "configured to be in communication with" or a "system" or "subsystem" thereof. This terminology is intended to be non-limiting and, where appropriate, be interpreted to include, without limitation, wired and wireless communication using any one or a plurality of a suitable protocols, as well as communication methods that are constantly maintained, are made on a periodic basis, and/or made or initiated on an as-needed basis.

Where they are used, the terms "first", "second", and so on, do not necessarily denote any ordinal, sequential, or priority relation, but are simply used to more clearly distinguish one element or set of elements from another, unless specified otherwise.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

An embodiment of the present disclosure provides AR viewing and display having a large FOV with an optical system having an optical path that folds in the horizontal or x-direction, the direction substantially parallel (+/−15 degrees) to a line between left and right pupils of a viewer, for forming an intermediate image to the curved mirror. An embodiment of the AR system of the present disclosure has a component arrangement as shown schematically in the front view of FIG. 1A and from the side in FIG. 1B. The corresponding light path is shown schematically in FIGS. 2A and 2B, respectively. A flat-panel display is energized as an image generator 10 to form an image and to direct image-bearing light through beam-shaping optics and to a folding prism 20 that redirects the image-bearing light towards a beam splitter 24 and to a curved mirror 30 for forming the virtual image from electronically generated image content. Image generator 10 can be a display that emits light, such as an organic light-emitting device (OLED) array or a liquid crystal array or a micro-LED array with accompanying lenslets, or some other type of spatial light modulator useful for image generation.

Figure 3A:
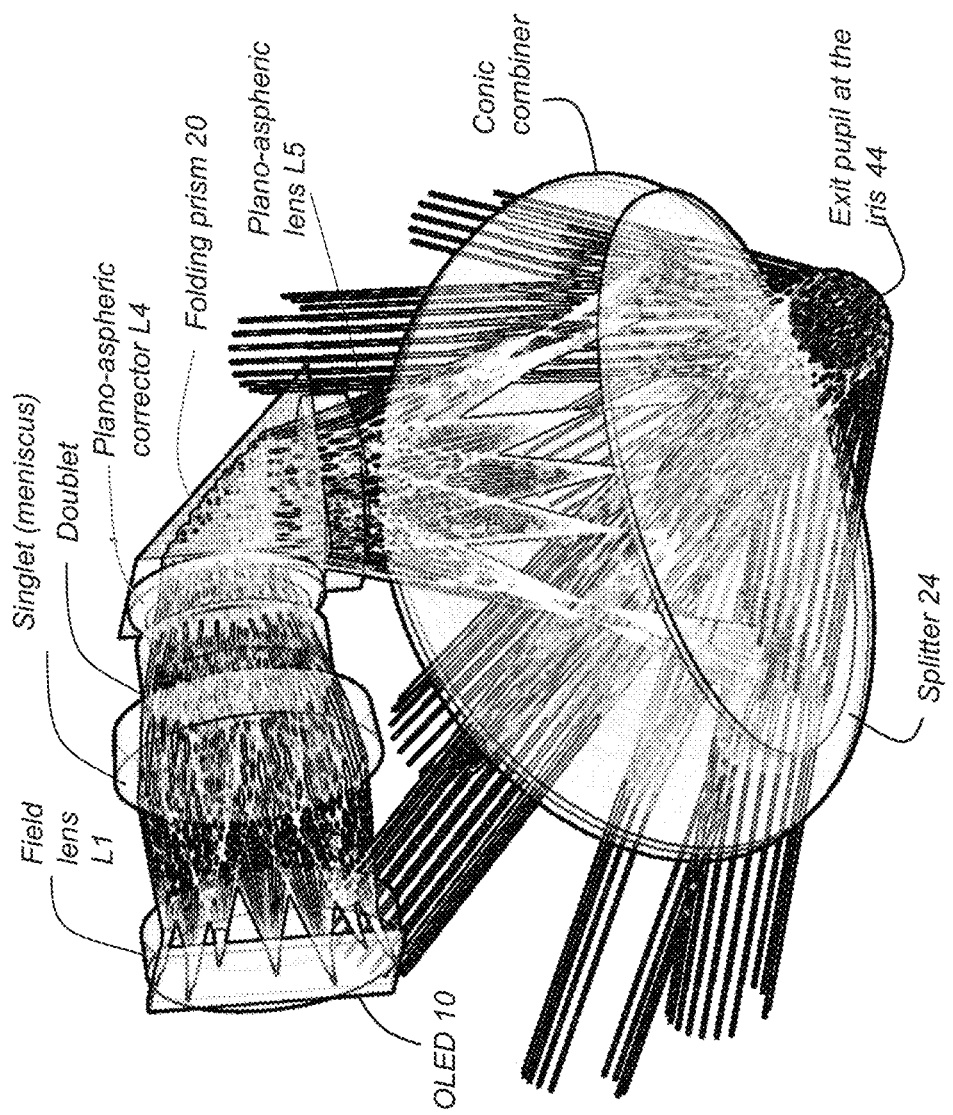
FIG. 3A is a schematic that shows, in perspective view, components of an optical apparatus for AR viewing.
Figure 3B:
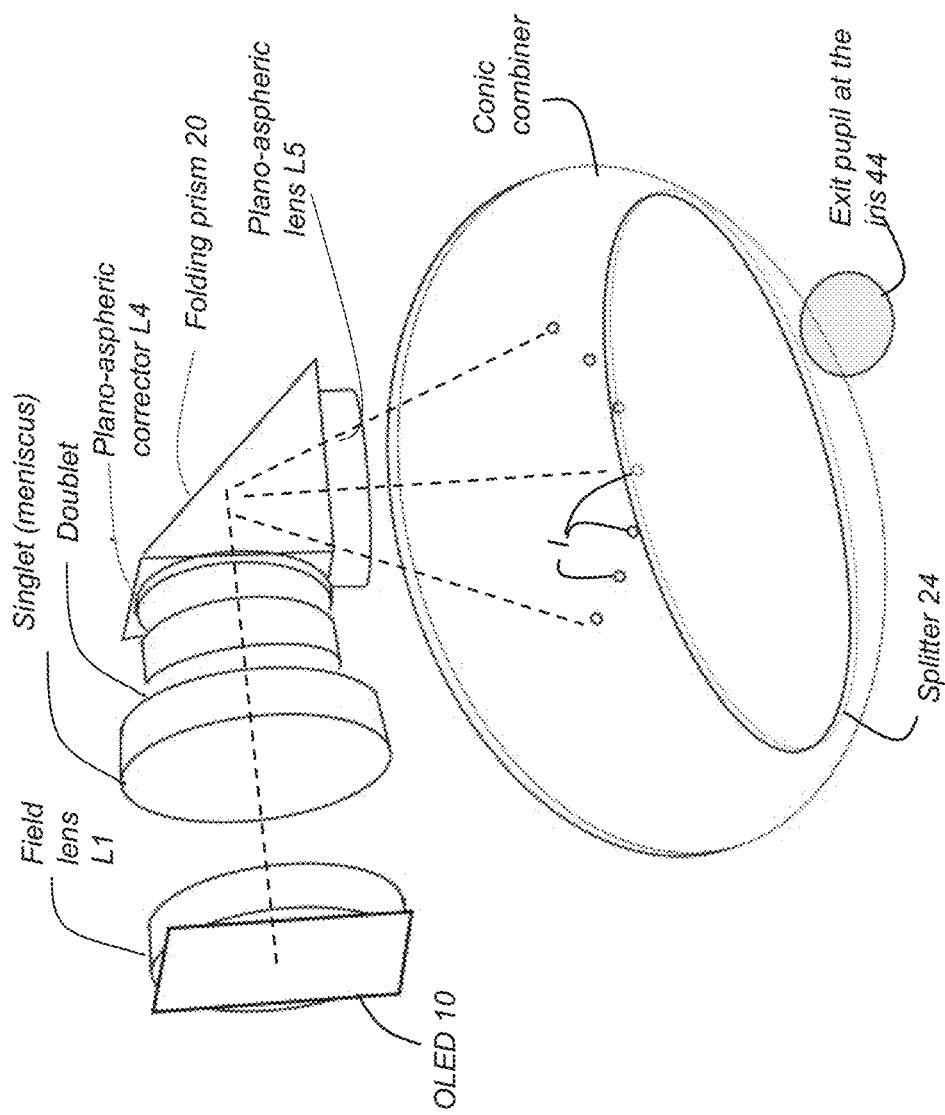
FIG. 3B is a simplified schematic of FIG. 3A.
Figure 4:
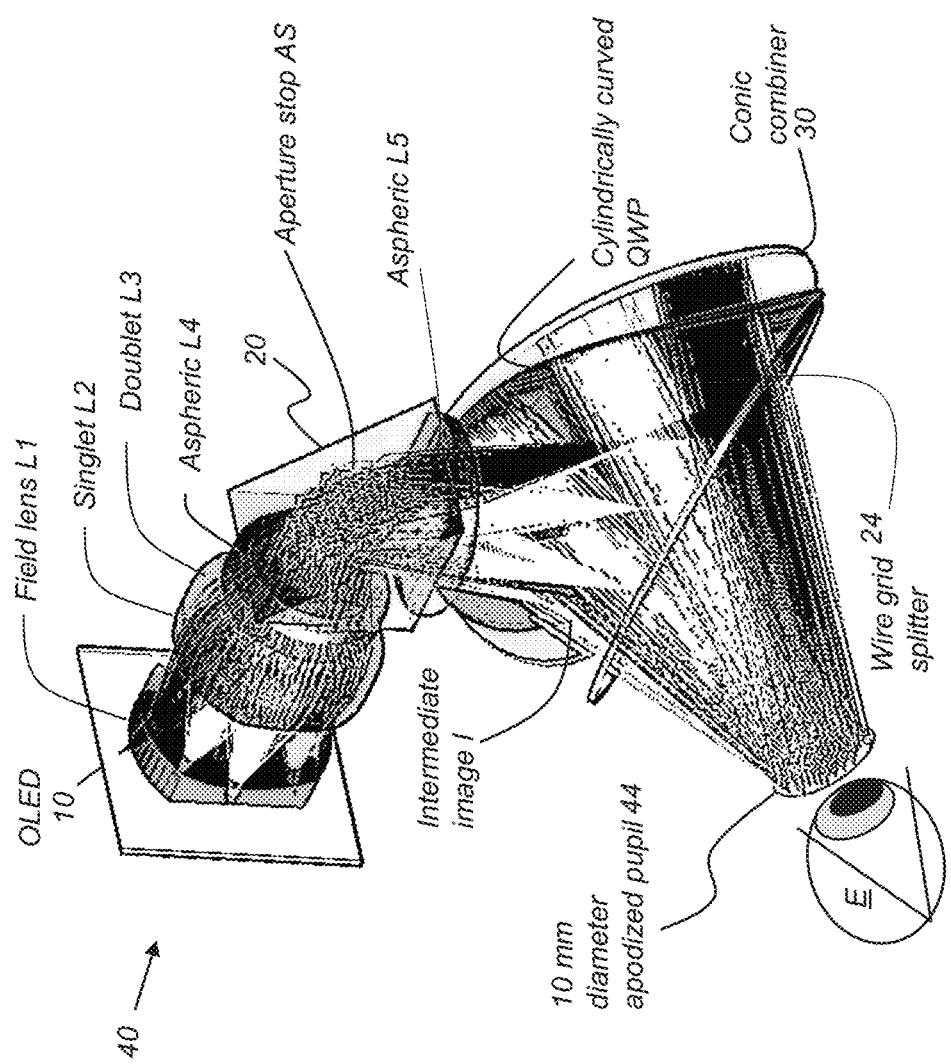
FIG. 4 is a schematic that shows, from an alternate perspective view, components of an optical apparatus for AR viewing.

In order to address the need for improved overall imaging performance, wider FOV, compactness, and other factors outlined in the background, embodiments of the present disclosure have a number of features shown particularly in FIGS. 3A, 3B, and 4. Specific features of interest include: (i) relay of the image generator 10 to form a curved intermediate image I as a conjugate image. As a type of "aerial" image, intermediate image I is formed in air, serving as the optical "object" for forming the virtual image. Intermediate image I is formed along the curved focal surface of curved mirror 30, with the approximate position shown by a dashed line in FIG. 5. An optical relay 40, with particular structure as described in more detail subsequently, conjugates the image formed from image generator 10 to the curved intermediate image I along the focal surface. Curved mirror 30 is partially transmissive, such as between about 30% to 70% transmissive, for example, allowing visibility of the real-world object scene to the viewer. A nominal transmission range of about 50% is useful in many applications. (ii) use of a cylindrically curved quarter-wave plate (QWP) between mirror 30 and beam splitter 24. Curvature of this element helps to reduce variations of the retardation imparted to the image-bearing light by the QWP over the field of view. (iii) large exit pupil 44. System optics can form a 10 mm exit pupil at the viewer's eye-box for eye E. Forming a suitably sized pupil for the viewer helps to provide an eyebox of reasonable dimensions to allow eye movement, without noticeable vignetting. Also, an enlarged eyebox permits the headset to move or slip without noticeable degradation of the viewed image(s). The apparatus does not need to provide pupil expansion, such as is used in existing wearable display apparatus, but uses pupil-forming optics for improved efficiency and brightness, as well as for improved image resolution.

Significantly, the eyes of the viewer can clearly see and be seen by others, with minimal impediment from the beam splitter and curved mirror optics that provide the electronically generated virtual image.

With the optical arrangement shown, the aperture stop AS lies within prism 20 of the image relay, along or very near the fold surface that is provided. This arrangement is advantageous for component packaging and spacing, allowing prism 20 to be reduced in size over other configurations using a folding prism.

The given design allows an FOV along the horizontal (x) axis, the axis parallel to a line between left and right pupils of the viewer's eyes, of greater than 50 degrees. The FOV aspect ratio (horizontal:vertical) equals or exceeds 1.5. Digital correction is not needed for distortion or lateral color.

According to an embodiment, curved mirror 30 has a conic surface shape. The conic shape is advantaged, in the embodiment shown herein, helping to control chief ray angles, thus correcting for distortion.

Depending on whether or not polarization is used for configuring light paths, beam splitter 24 can be either a polarization-neutral beam splitter or a polarization beam splitter. Beam splitter 24 can be, for example, a wire grid polarization beam splitter as shown in FIG. 4.

Image Relay 40

Figure 5:
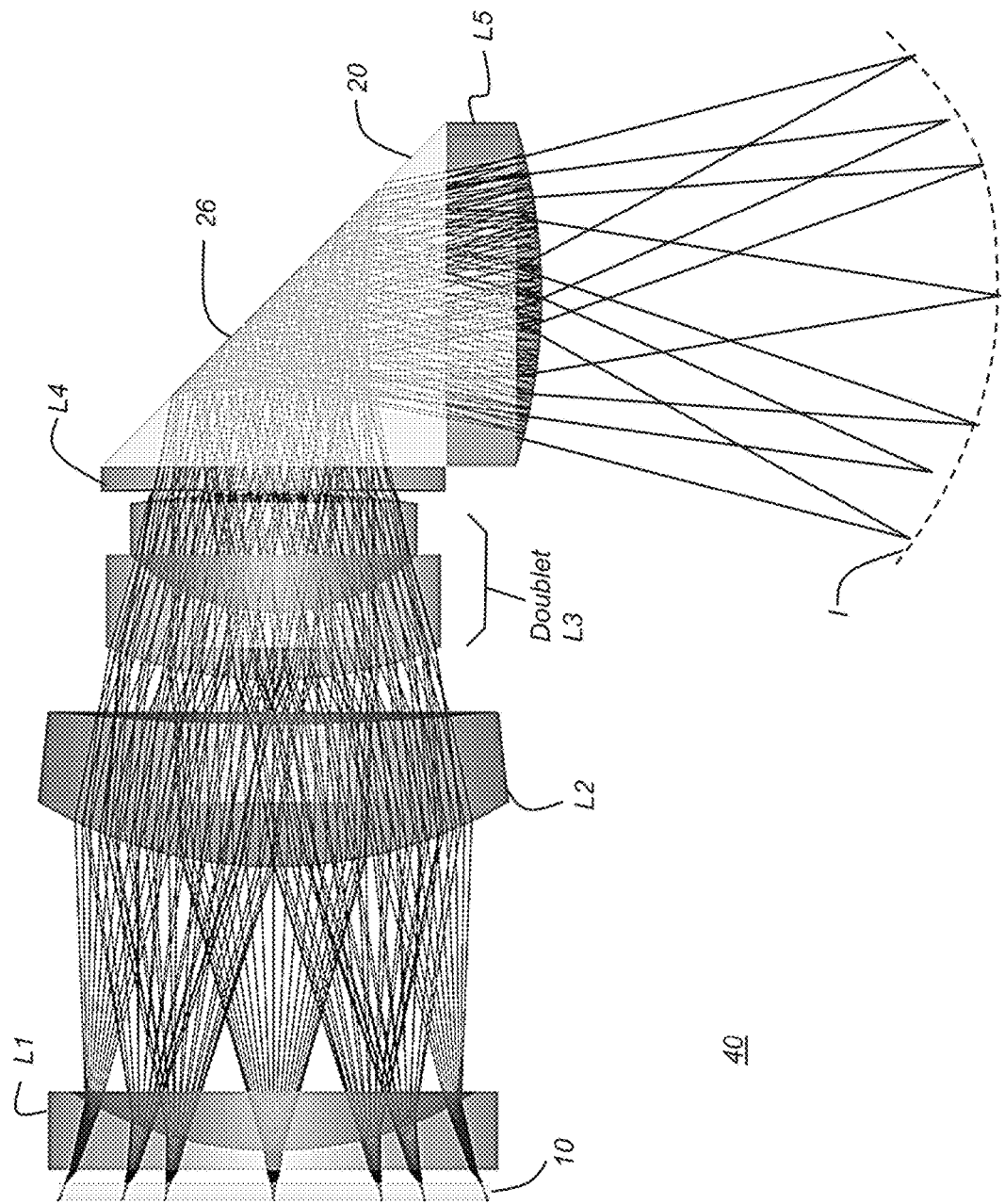
FIG. 5 is a side view schematic of an image relay.

FIG. 5 shows an enlarged side view of relay 40 for relay of the display image from an electroluminescent display (such as an OLED in the examples shown) to the focal surface position of mirror 30 (shown in a perspective view in FIG. 4) and for shaping the relayed image to suitable curvature to correct distortion. A concave-plano field lens LI, with sides truncated along the vertical direction as shown in FIG. 4 in order to reduce weight and provide a more compact system, shapes the light from OLED display image generator 10, providing a beam to a meniscus singlet lens L2.

From lens L2, the imaging light goes to a doublet L3 having a concave/convex flint glass lens cemented to a crown glass lens.

An aspheric plano-convex lens L4 is in optical contact with the input face of prism 20, such as cemented to prism 20. A second plano-aspheric lens L5 can be cemented to the output face of prism 20. This cemented arrangement facilitates alignment of these optical components. According to an alternate embodiment, only a single plano-aspheric lens L4 is deployed at the prism 20 input surface.

The turning surface 26 of prism 20 is coated to enhance reflection. Hypotenuse or turning surface 26 of the prism is essentially the relay (and system) aperture stop.

Intermediate image I is formed in the shape and location of the focal surface of the curved mirror. Proceeding backward along the optical path from intermediate image I are the following components: Plano-asphere lens L5; Folding prism 20 with turning surface 26; plano-asphere lens L4; Doublet L3; Meniscus singlet L2; Field lens LI; Image source or generator, display 10

Figure 6A:
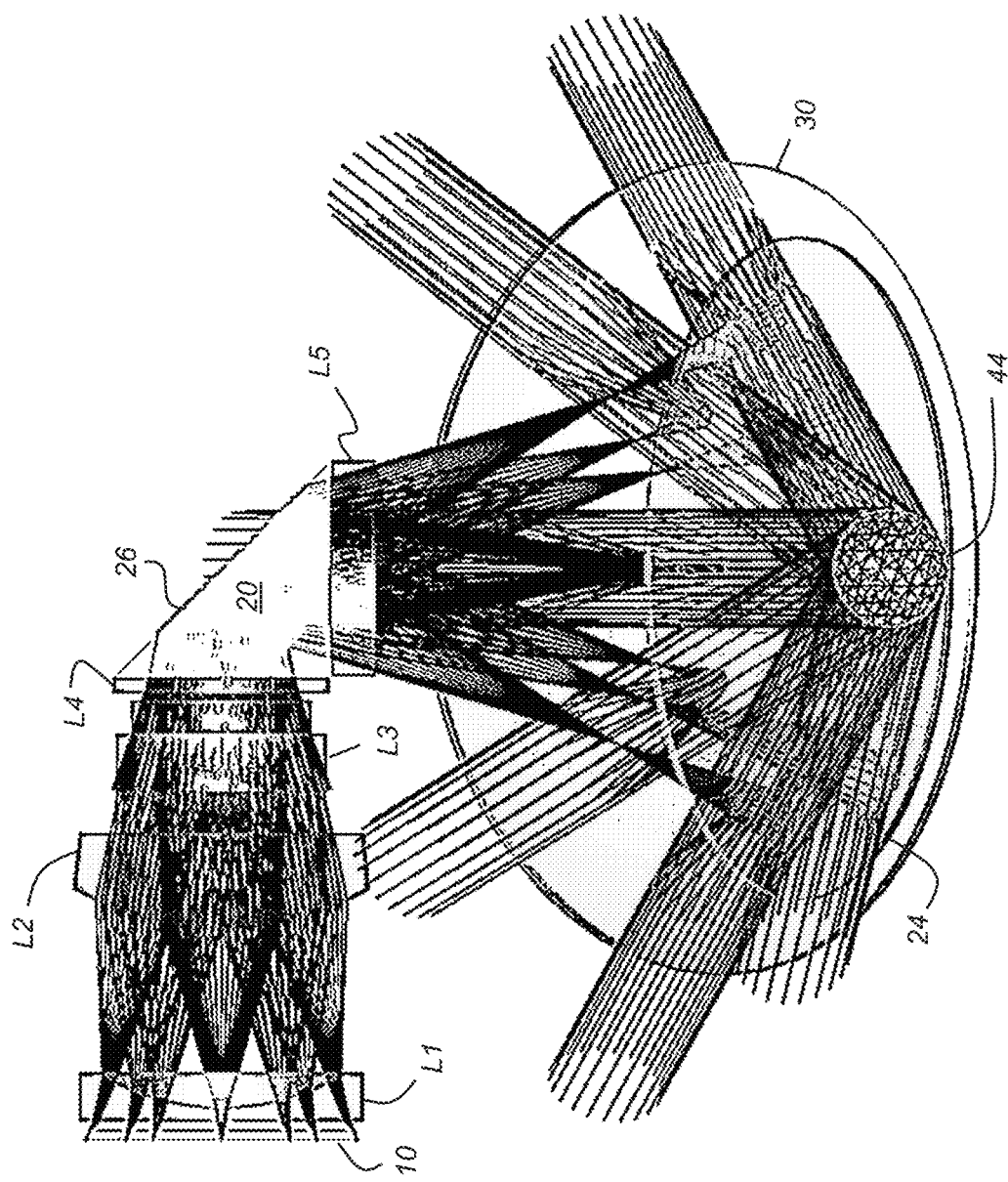
FIGS. 6A, 6B are schematic, showing the image relay and components for forming the exit pupil.
Figure 6B:
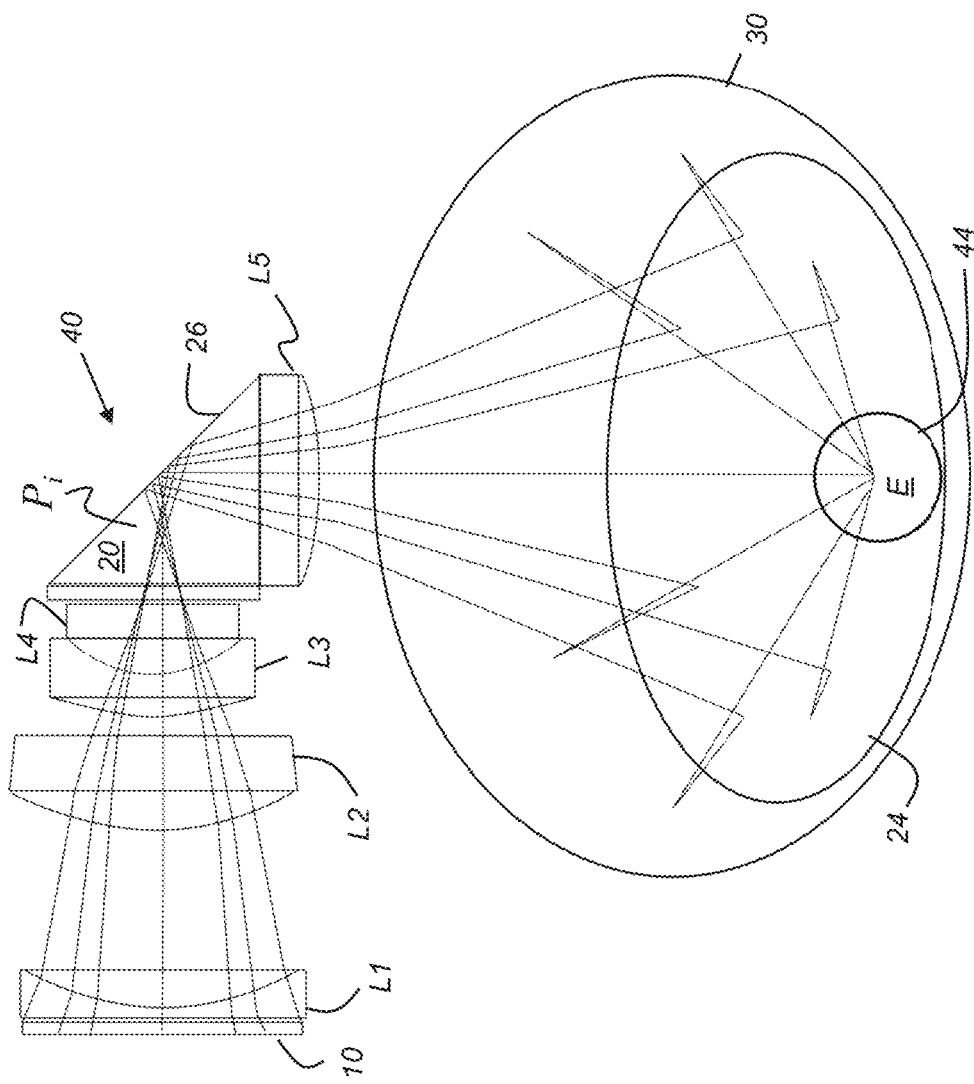

FIG. 6A and simplified FIG. 6B show an alternate view of the display optics from exit pupil 44. Chief rays are shown in FIG. 6B; these chief rays converge at the position of exit pupil 44 at eye E. FIG. 6B also shows the approximate position of an intermediate pupil P, at the aperture stop, near the folding surface 26 of prism 20.

Figure 1A:
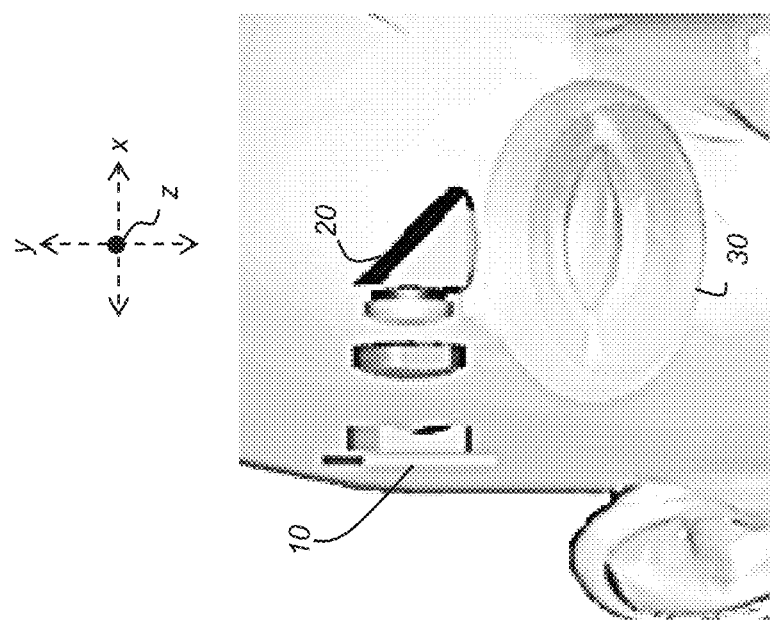
FIG. 1A is a schematic front view showing placement of optical components of the system.
Figure 2B:
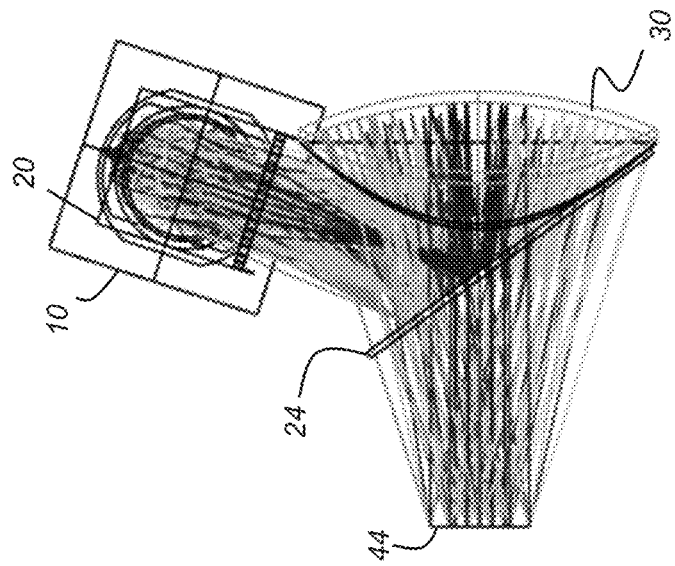
FIG. 2B is a schematic side view showing the optical path through components of the system.
Figure 2A:
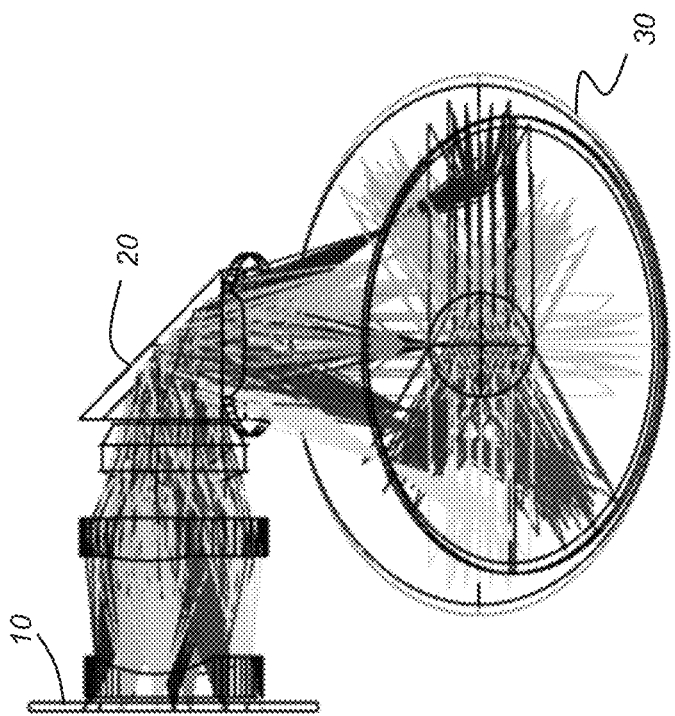
FIG. 2A is a schematic front view showing the optical path through components of the system.

As shown in FIGS. 1A and 4, the image generator is disposed to direct image-bearing light beam in a horizontal direction and along a path that lies above eye-level, as the display optics are normally worn by a sitting or standing viewer. Prism 20 can be tilted slightly away from the forehead of the viewer, to direct light in front of the face at an oblique angle to vertical, as shown in the embodiment of FIG. 2B.

The layout and routing of the optical path are particularly suitable for providing augmented reality 2D and 3D viewing in a wearable device. Using relay 40 allows the positioning of image generator 10 to be out of the direct field of view; in addition, relay 40 allows image generator 10 to be positioned at sufficient distance away from the skin surface to avoid contact and consequent discomfort. The use of a first x-direction (horizontal) fold, followed by a y-direction (vertical) folding enables the imaging optics to be compactly packaged with reasonable optical path distance to allow a measure of light beam shaping and correction. Prism 20 can be rotated over at least a range of angles about the x axis, allowing a measure of alignment as well as adaptation to different mirror 30 curvatures. Employing a curved surface for an optional QWP component helps to reduce variations, over the FOV, of retardation imparted by the QWP; excessive variation over the field may otherwise cause some brightness fall-off.

Using a wire-grid polarizer reduces light loss, allowing high levels of visibility to the external, real-world object scene content, along with reduced light leakage over other polarization components.

Image source 10 may be unpolarized. In one embodiment, a polarizing beam splitter is used, such as a wire grid splitter made by Moxtek, Inc., Orem, UT. This type of beam splitter reflects only one polarization, usually S polarization, towards the conic combiner. The orthogonal polarization, P polarization, is transmitted and is absorbed (absorber not shown). To prevent the small amount of P light from being reflected, an optional polarizer can be placed at the image source.

The mirror 30 provides a conic combiner in embodiments shown, with power only for the generated image and not for the visible field. The curved mirror 30 can be a double conic for improved image formation. Various types of coatings can be provided on the mirror 30 combiner, including, but not limited to dichroic coatings, metal coatings, such as to provide a half-silvered reflector, electrochromatic coatings, anti-reflection (AR) coatings. Mirror 30 can be fully or partially reflective or fully or partially transparent, with some amount of reflectivity.

Embodiments of the present disclosure provide a measure of distance between the image generator (OLED or other spatial light modulator device) and the face and temples of the viewer. This helps to prevent discomfort due to heat where the wearable display is worn for an extended period of time.

The particular arrangement of image-forming components provides suitable image quality and high resolution to allow reading and other visual activity involving fine detail.

According to an embodiment of the present disclosure, the optical system described herein is suitable for applications requiring sensitivity to the viewer, including not only viewer comfort, but some level of vision monitoring and adaptation. For example, the apparatus described herein can be used as part of a system for compensating for vision problems. By way of example, FIGS. 6C and 7A-7C show various features of an embodiment useful for compensating for macular degeneration. This type of application can require a measure of viewer monitoring and adaptation, possibly including adjustment of generated data content suitable for the viewer.

Gaze Tracking

According to an aspect of the present disclosure, gaze tracking can be provided as part of the wearable optics system and used to adjust system parameters according to perceived focus of attention for the viewer. Cameras and infrared (IR) light sources provided on a headset, as shown subsequently, can provide the gaze-tracking function and corresponding angular measurement data. Gaze tracking can be combined with the controller and with a camera image FOV intake. For instance, change of the image aspect ratio for generated image data content may be appropriate, allowing the system to adapt image content to the dimensional parameters available from the image generation system. Thus, for example, cameras associated with the HMD can oversample the real-world input from the object scene, acquiring a wider FOV than can be displayed by system optics. Gaze tracking identifies the actual FOV available to the viewer. The resulting buffered images are related to the reduced FOV video that can be generated, as controlled by using the sector of the FOV identified using eye gaze recognition.

Figure 6C:
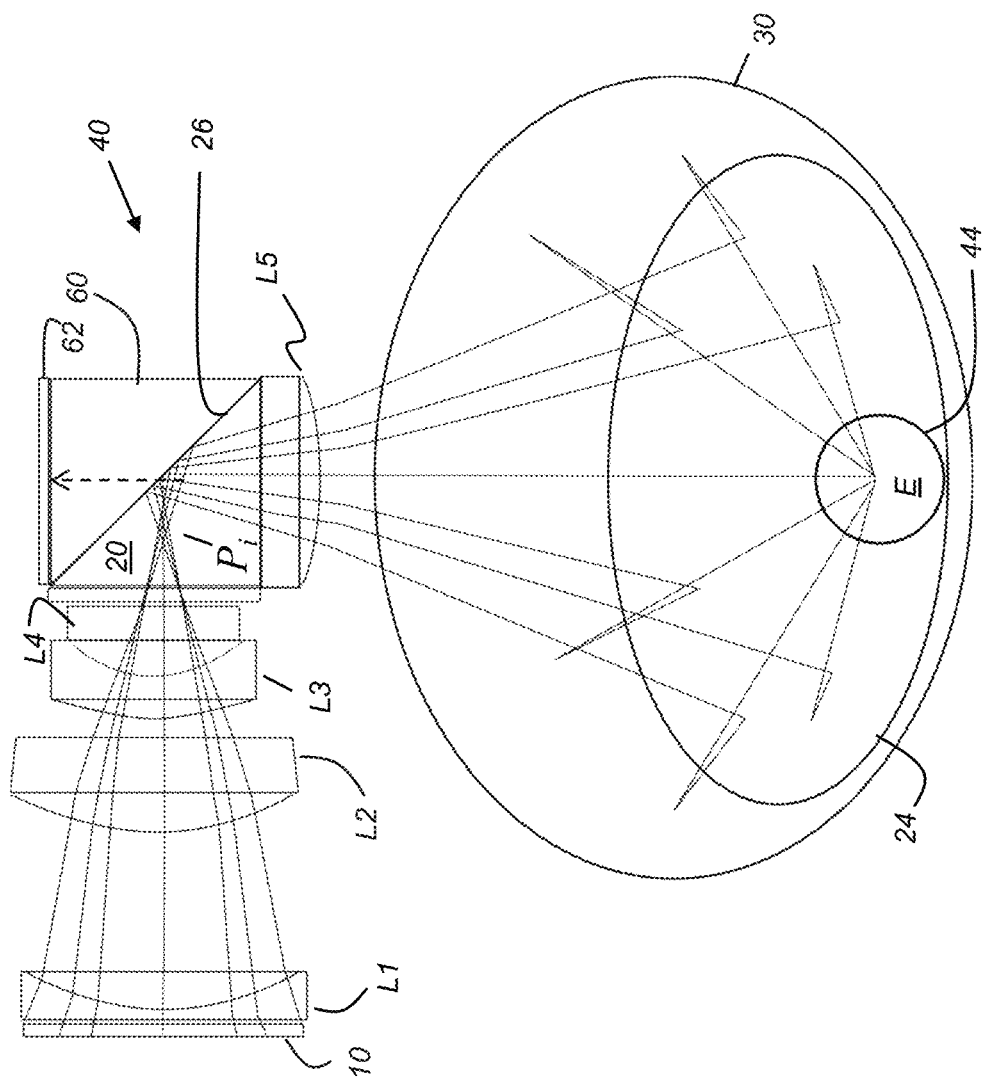
FIG. 6C is a schematic view that shows an alternate embodiment of the present disclosure that employs the imaging path for eye tracking.

FIG. 6C is a schematic view that shows an alternate embodiment of the present disclosure that employs the imaging path itself for eye tracking and provides 1:1 imaging of the viewer's iris. IR light, or other sensing light, is directed along the optical path, such as generated from, through, or at some other point along the output path of, image generator display 10. Folding surface 26 can be formed as a dichroic surface, treated to direct the sensing light to beam splitter 24 and to curved mirror 30 and to the iris of eye E. Sensor light returning from the iris generally retraces the light path to prism 20. A portion of this returned light from the viewer's eye, as shown by a dashed line in FIG. 6C, can be transmitted, rather than reflected, through surface 26 and be conveyed through a complementary facing prism 60 to a tracking sensor 62, which can be a camera, imaging array, or other imaging sensor according to an embodiment. This returned light sensed at sensor 62 can be IR light, for example. The IR light source can be directed to the eye from any suitable position, and can be directed through or alongside components on the optical axis. Surface 26 of the prism is then configured to reflect most of the visible light, performing its turning function for image-bearing light, and to transmit IR light suitably for gaze tracking.

Other configurations are possible. Thus, for example, a dichroic coating can be employed for surface 26, or some other coating can be employed that provides the needed redirection by reflection of the bulk of image-bearing light, while also allowing sufficient light leakage for sensing.

The embodiment of FIG. 6C can be modified in a number of ways to allow eye gaze tracking through portions of the imaging path. For example, with corresponding changes to components, the use of IR light as a sensed light can be replaced by employing visible light. This would require surface 26 to be partially reflective in the visible range, such as 90% reflective and 10% transmissive, for example, wherein the transmitted light is the sensed portion. One or more additional lenses, not shown in FIG. 6C, could be provided in the path of light to sensor 62 for gaze tracking using the image path as described herein.

Headset Configurations

Figure 7A:
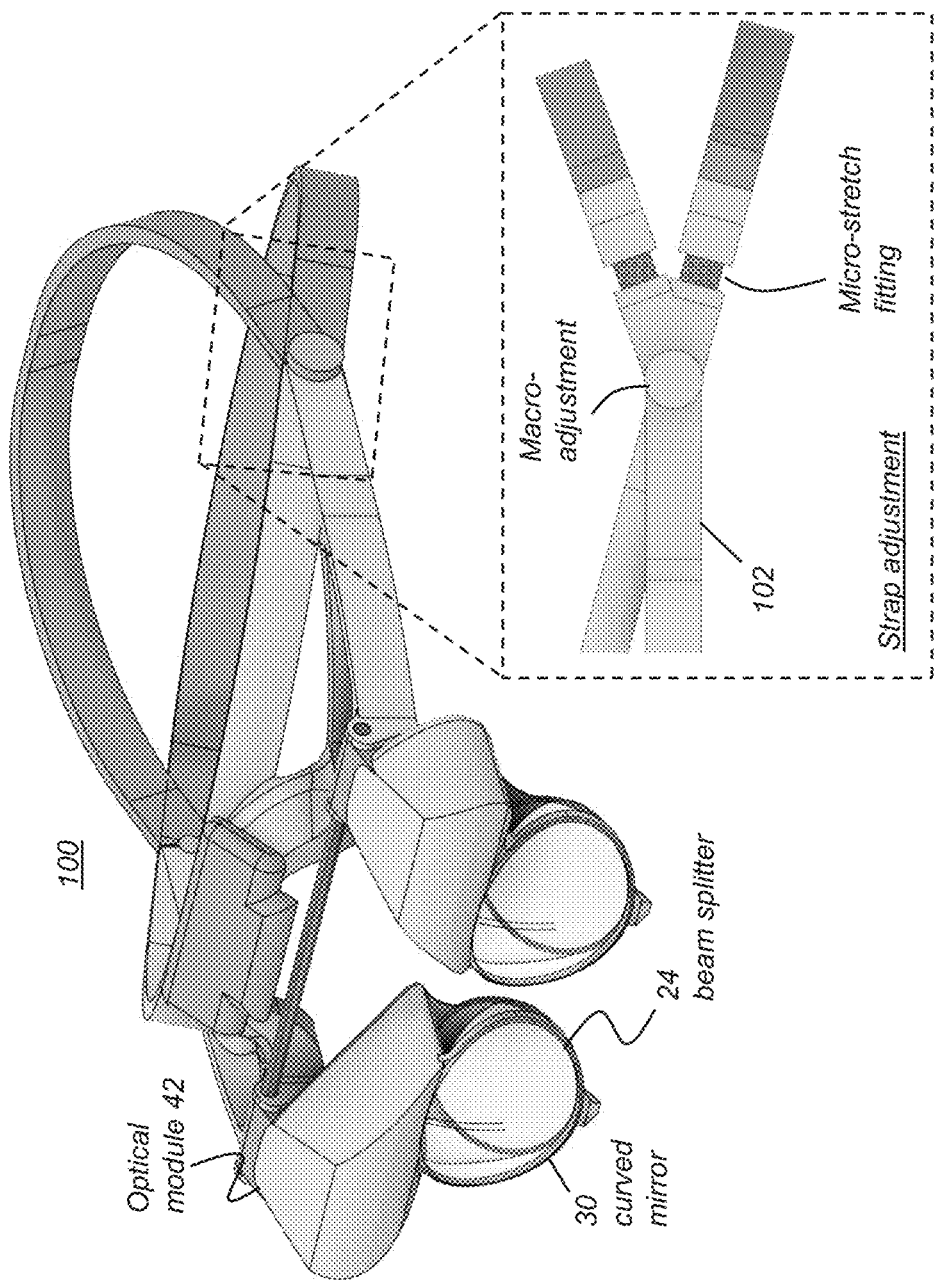
FIGS. 7A-7C show various features of an embodiment useful for compensating for macular degeneration.
Figure 7B:
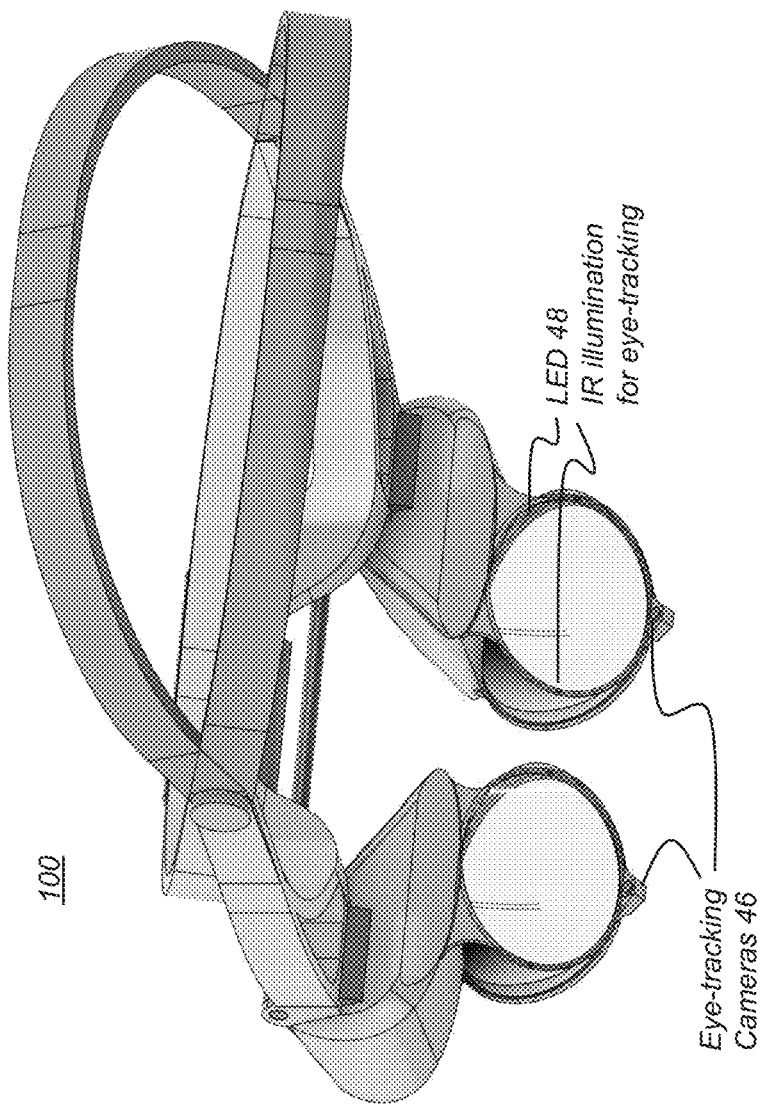
Figure 7C:
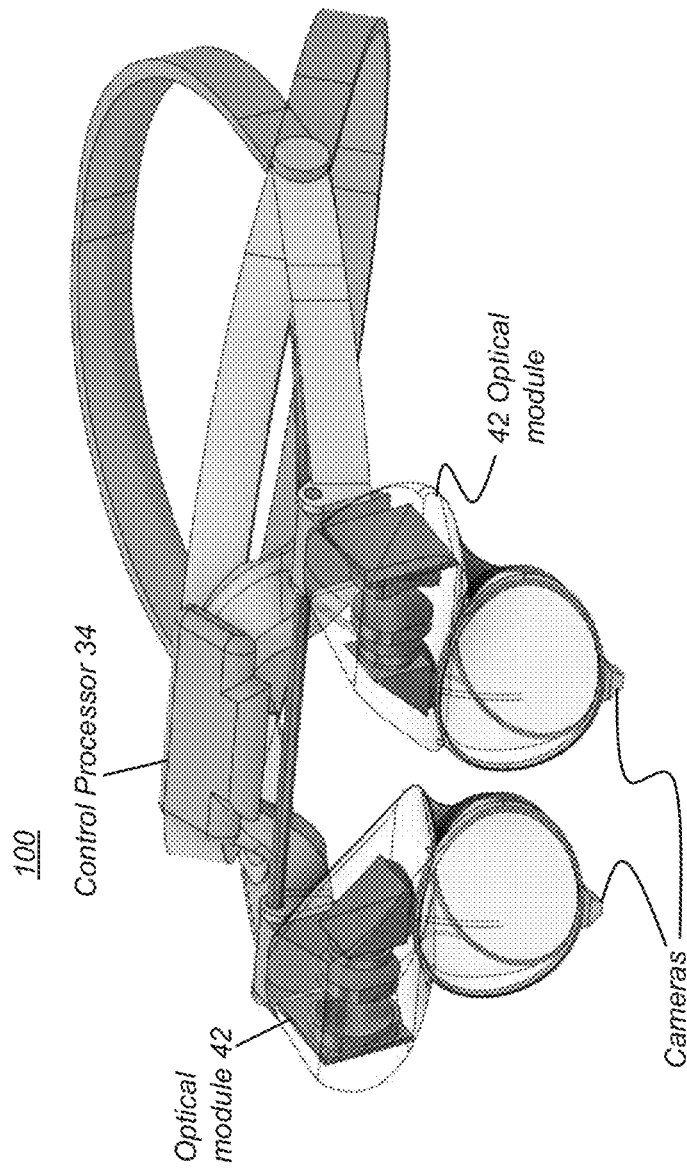

FIGS. 7A-7C show a stereoscopic display headset 100 that has separate optical paths for the left and right eyes of a viewer. As particularly shown in FIGS. 7A and 7C, the optical relay 40 can be compactly packaged as part of a headset 100 within an optical module 42 that is disposed above eye level, as the system is normally worn. Beam splitter 24 and curved mirror 30 are arranged to lie along the visual axis of the viewer. An adjustable strap 102 can be provided to allow adaptation to viewer anatomy. A control logic processor 34 can include the needed electronics for controlling operation of the optical apparatus; processor 34 components can be mounted above the visual axis and disposed away from the viewer's forehead. Control logic processor 34 can alternately be separated from, but in wired or wireless signal communication with, headset 100.

Eye-tracking can be provided from the headset using the arrangement previously described with respect to FIG. 6C or using one or more eye-tracking cameras 46, working in conjunction with illumination LEDs 48, typically infra-red (IR) sources, as shown in FIG. 7B.

Figure 8:
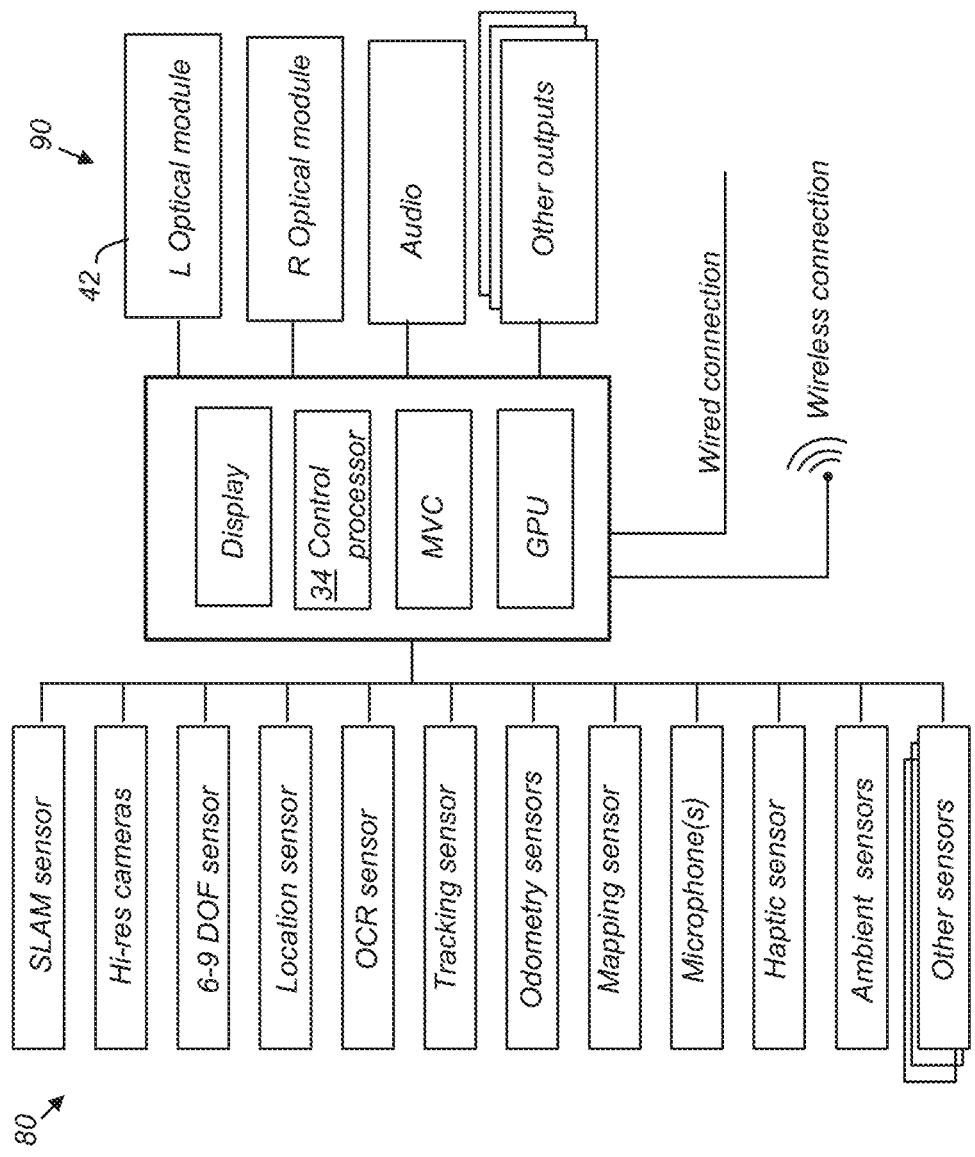
FIG. 8 is a block diagram illustration showing integrated components for an HMD system in an exemplary embodiment.

FIG. 8 shows a headset 100 that incorporates the optical system described herein as part of a wearable system for providing user information and guidance in performing a task or assignment. Optical relay 40 and its associated components are packaged within an optical module 42. A variety of sensors 80, described in detail subsequently, can include one or more SLAM sensors 82, as well as sensors for various environmental or ambient conditions such as temperature, humidity, and the like, viewer-related, contextual data, cameras, and other information-gathering devices can be integrated with or in wireless or wired signal communication with control logic and related processing components of the HMD headset. Sensors can be provided to support AR imaging, VR imaging, or mixed AR/VR imaging modes of operation.

Connection to power and to signal sources for the headset can be obtained by connection of the headband of headset 100 with external power and signal sources, such as other computing and processing equipment worn or carried by the viewer.

System Block Diagram

Figure 9:
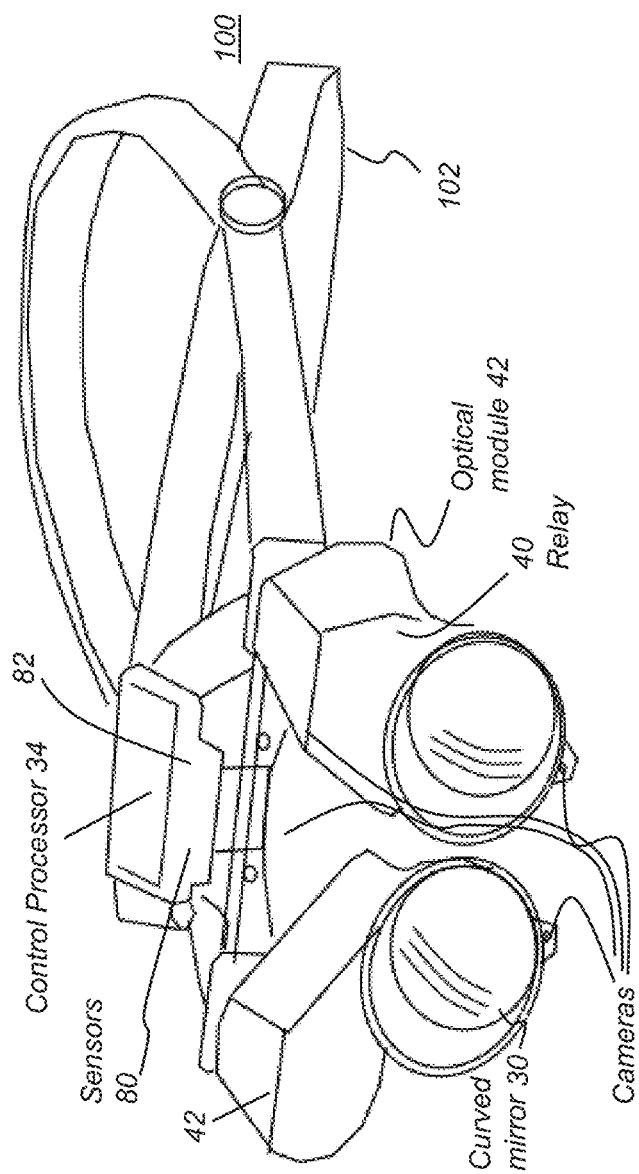
FIG. 9 is a perspective view that shows positions of various sensors, processor, and components of the head-mounted display according to an embodiment.

FIG. 8 is a diagrammatic block diagram illustration showing, for an exemplary embodiment, interrelation of integrated components for an HMD system including input sensors 80, output components and systems 90, logic and control components including processors, graphic processing units (GPU), MVC and other devices. Sensors 80 can include high-resolution cameras, multiple displays per eye, 6 to 9 degrees of freedom sensor or other sensors necessary for detection of hand-gesturing, head-gesturing, voice control, positional location, and estimation or navigation, as well as optical character recognition (OCR), tracking, marker-based or markerless-based AR, location, SLAM sensors, concurrent odometry and mapping sensors, microphones and noise-cancelling microphones, and any other sensors which could be coupled to and used on an AR/VR headset. Previous figures, for example, gave a diagrammatic illustration of a placement of an IR light for the eye-tracking subsystem. The perspective view of FIG. 9 shows positions of various sensors, processor, and components coupled to headset 100 according to an embodiment of the present disclosure.

Among other sensor technologies which may be housed on the HMD are manual control inputs. These can include digital buttons, which may include power buttons, and a D-Pad or control-pad for accessing and controlling functions by the user, which may or may not be in a dongle; and if not in a dongle then it may exist on the headset or in a wired or wireless remote control. The sensors listed above may include their operating systems and output. The control mechanism may also respond to other types of input, including voice command, SLAM, eye tracking, head or hand gesturing, or any other method which can be employed with the sensors and systems mentioned above.

HMD 100 may also house connectors such as power connection for recharging a battery or for direct connection to an AC source, for the HMD as well as for related input and output devices. There can also be additional external connectors for HDMI, sound, and other input/outputs, such as additional image overlay display, or for a diagnostics protocol for upgrading the system. The HMD may also house the microprocessor(s) control circuits. HMD 100 may also contain one or more display per eye, allowing the use of any number of additional projectors, like Pico projectors, or micro-displays. The displays may be used to project though either catoptric system, a dioptric system, or catadioptric system, or combinations thereof, such as to generate an ultra-short-throw image onto reflective lenses or to project to some other surface, which can be clear plastic, like a polycarbonate resin thermoplastic (Lexan).

The HMD 100 may also house a rechargeable battery which is not typically removed, thus, providing spare energy to continue to power the HMD when the removable battery is exhausted or removed. While this battery may be smaller and only have a run-time of several minutes, it can provide the HMD with a "hot-swap" battery system that permits a user to keep viewing from the HMD for a time after the removeable battery has died or been removed.

HMD 100 may also include a strap and counterweight or other headgear to balance the HMD and maintain its position on the head. The HMD may contain a "pinch adjustor" to adjust strap 102. In addition, the HMD may or may not include a "dongle" whereby one or more of the systems or subsystems may be connected via wired or wireless to another device, such as could be worn on a belt or carried in a pocket to reduce the overall weight of the HMD 100. In one embodiment, the HMD may be connected to another device which is providing power, while in an alternative embodiment, the HMD may have its own power from the mains or from wireless power transmission or from a battery.

Further, in another embodiment, the HMD may house other subsystems such as the cameras, the microcontrollers, the connectors, central processing unit, graphics processing unit, software, firmware, microphones, speakers, display, and collector lens; the displays, and other subsystems.

In another embodiment, the HMD may contain a front facing sensor array along with other sensors mentioned above and optical character recognition (OCR) and/or cameras to read and/or measure information from the real world object scene. Additionally, the HMD may contain one or more connectors to connect via wire to the outside world for power and data (i.e. USB, HDMI, MiniUSB).

Alternatively, some parts of the system mentioned herein may be in a dongle attached to the HMD via wire or wireless connection. Alternatively, some portions of the system mentioned herein may be contained in a connected device, like a laptop, smart phone, or Wi-Fi router. Alternatively, some parts of the system mentioned herein may be contained in a smartphone or may be transferred back and forth from a smartphone to the HMD, when synced, such as the HMD displaying the smartphone apps and other features of the smartphone that would otherwise be displayed on the smartphone display. Alternatively, the HMD may contain and display all the features that a smartphone can.

In another aspect of the present disclosure, HMD 100 may contain all the features of a typical smartphone and no connection may be needed with a smartphone to have all the smartphone features, like web or cell calling, app use, SMS, MMS, or similar texting, emailing, logging on to the internet, and the like.

According to an aspect of the present disclosure, the HMD headset may provide a computer mediated video shown on the reflective lens layer such that the wearer may see both the real world and the augmented video at the same time. In this aspect of the disclosure, such features as voice/speech recognition, gesture recognition, obstacle avoidance, an accelerometer, a magnetometer, gyroscope, GPS, spatial mapping (as used in simultaneous localization and mapping (SLAM)), cellular radio frequencies, Wi-Fi frequencies, Bluetooth and Bluetooth Light connections, infrared cameras, and other light, sound, movement, and temperature sensors may be employed, as well as infrared lighting, and eye-tracking.

Batteries and other power connections may be needed for various devices, but are omitted from schematic figures for clarity of other features.

SLAM Sensors

Embodiments of the disclosure can further include mechanisms and logic that provide SLAM (simultaneous localization and mapping) capabilities to support the viewer. SLAM uses statistical techniques to map the viewer's environment and to maintain information on the viewer's relative position within that environment. For example, an image from a Simultaneous Localization and Mapping (SLAM) camera configured for the wearable unit can detect a location of the HMD wearer within the given environment. SLAM capabilities can also be useful where some portion of the viewer's FOV is blocked or otherwise obscured. Using SLAM allows the system to present portions of the real-world object scene in the electronically generated image. SLAM capability allows generation and display of image content related to the real-world viewer environment.

To support SLAM capabilities, a headset as shown in the example of FIG. 9 can include one or more SLAM sensors 82, such as cameras. In some cases, the SLAM camera may include a visual spectrum camera, an infrared (IR) camera, or a near-IR (NIR) camera. Additionally, or alternatively, the SLAM camera may be include or exclude the viewer from its field of view. Techniques for providing SLAM capabilities are known to those skilled in the mapping arts and can include processing of local image content as well as use of tracking data.

SLAM logic can be provided by control logic processor 34 or by an external processor that is in signal communication with processor 34, including processors that are connected to the wearable display device by a wired connection or, alternately, processors that are in wireless communication with control processor 34.

IPD Adjustment System

Embodiments of the present disclosure address the need for HMD system adjustment to viewer anatomy, with benefits for system efficiency and usability. One aspect of variable viewer anatomy relates to inter-pupil distance (IPD). This well-known characteristic relates to overall head dimensions and position of the eye sockets. Mismatch of IPD by the device can make it difficult to provide image content and needed functions and can make the HMD difficult to wear and use for some viewers. Some systems provide manual methods for IPD adjustment. As shown in the perspective view of FIG. 10, the Applicants' HMD can provide an automated IPD adjustment system 110 that measures the IPD for the viewer and responds by adjusting the inter-pupil spacing, changing the distance between the left and right optical modules 42l and 42r, respectively.

Figure 10:
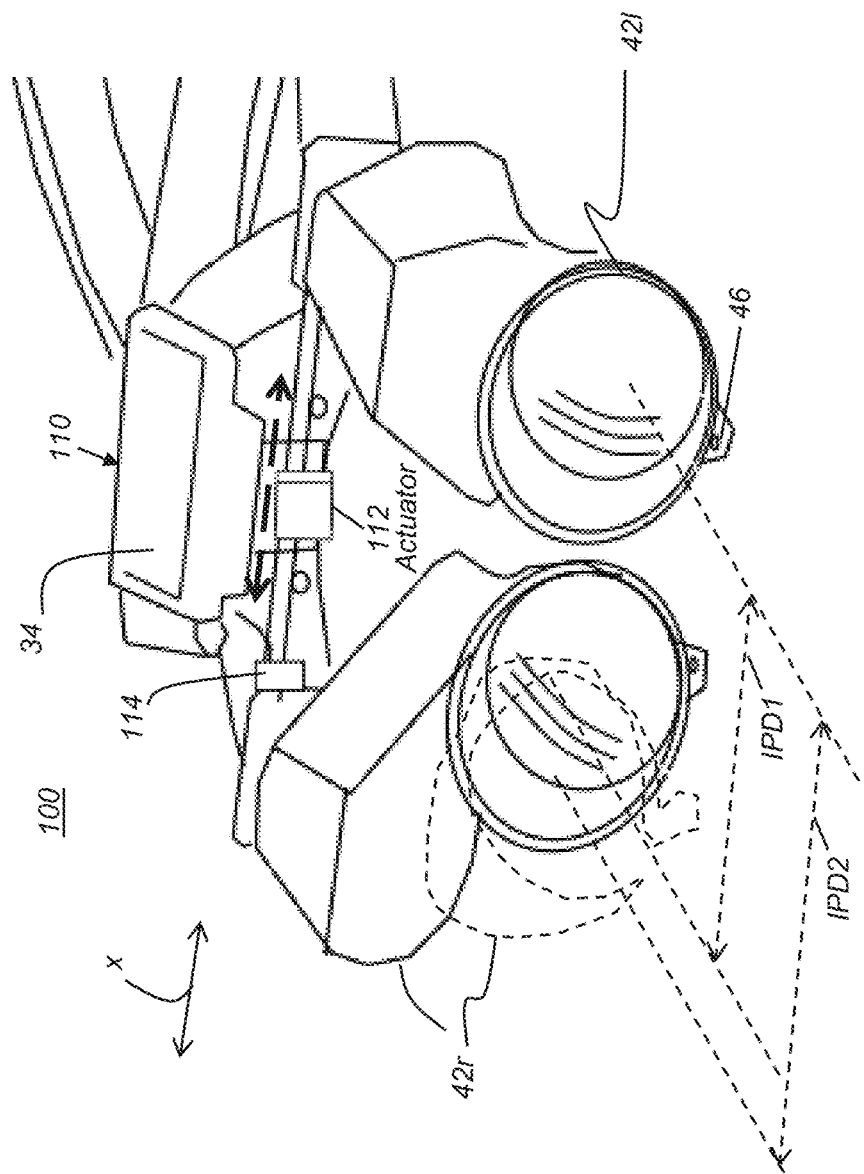
FIG. 10 is a schematic diagram that shows components of an interpupil distance adjustment system for the head-mounted display.

Referring to the FIG. 10 depiction, IPD adjustment system 110 can have an actuator 112 that urges one or both left and right optical modules 42l, 42r either farther apart, as shown in distance IPD2, or closer together as in distance IPD1. This adjustment can be performed at power-up or other system activation, at operator command, or at predetermined periods, or at some other time or in response to other event. According to an embodiment of the present disclosure, IPD adjustment settings can be stored for each viewer who has previously used the HMD. Then, upon entry of information identifying the viewer, the stored IPD adjustment settings can be restored as presets.

There may even be an external device, motorized or mechanical, which effects the activation of the preset IPD upon instruction prior to wearing the HMD.

In one embodiment, to execute the IPD adjustment function, eye-tracking cameras 46 on both left and right optical modules 42l, 42r obtain image content that allows pupil center detection by processor 34 logic. This logic determines the relative location of actual pupil centers and IP distance and determines whether or not the IPD between pupil centers is compatible with the positioning of left and right optical modules 42l, 42r. If positioning is appropriate, no IPD adjustment is necessary. Otherwise, an actuator 112 can be energized to translate one or both left and right optical modules 42l, 42r in the horizontal or x-direction as shown in FIG. 10. At various incremental positions, feedback logic can again measure and calculate any needed adjustment until a suitable IPD is achieved. For IPD adjustment, at least one of the left and right optical modules 42l and 42r can be movable; the other module 42l or 42r can also be movable or may be stationary.

Adjustable Focus

As a useful default for most virtual image viewability, HMD optics are typically designed to form the virtual image so that it appears to be at optical infinity, that is, with rays substantially in parallel to the optical axis. In an embodiment, the HMD optics are designed to provide the augmented virtual image at about 1 m distance from the viewer eyebox, equivalent to approximately 1 diopter prescription glasses.

Figure 11A:
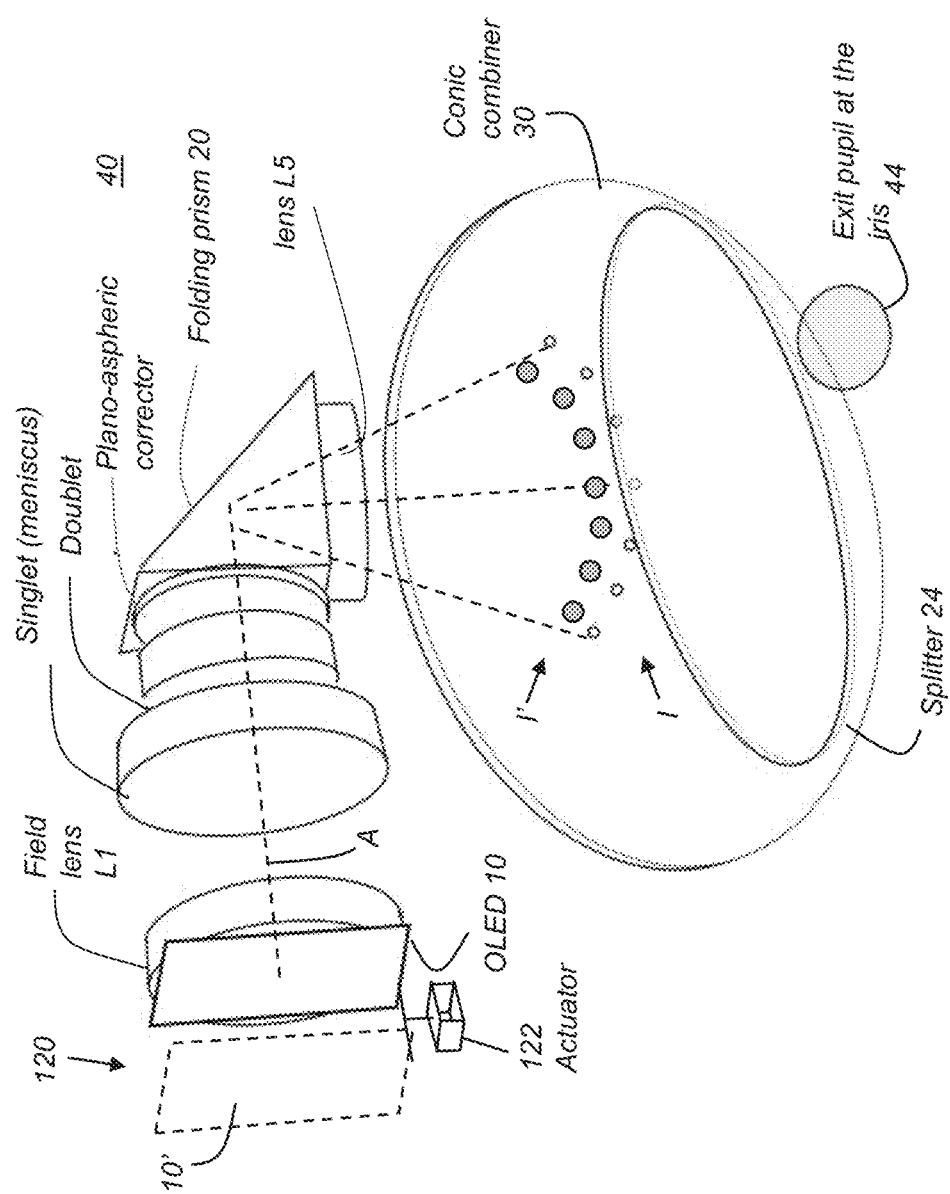
FIG. 11A is a schematic diagram showing optical relay components used for focal plane adjustment.

In some applications, closer focal length is advantageous. To achieve this, the Applicants' solution provides measurement and adjustment for diopter adjustment of the optical relay 40 optics. Referring to FIG. 11A, there is shown a schematic for relay 40 components that includes an actuator 122 and associated components as part of a focal plane adjustment system 120. By changing image generator 10 position along an axis A, a change in focal position is effected, such as with image generator 10 shifted to the dashed outline position denoted for image generator 10' in FIG. 11A. This movement causes a corresponding shift of intermediate image I to the position shown as image I' in relay 40. The splitter 24 and combiner, curved mirror 30, then condition the image-bearing light to provide a virtual image at a shifted spatial location. Actuator 122 can be a linear piezoelectric actuator, for example, capable of high-speed change between positions. One or more actuators 122 can be used for moving any of the components described hereinabove with relation to optical relay 40 in order to adjust the position of the focal plane.

Figure 11B:
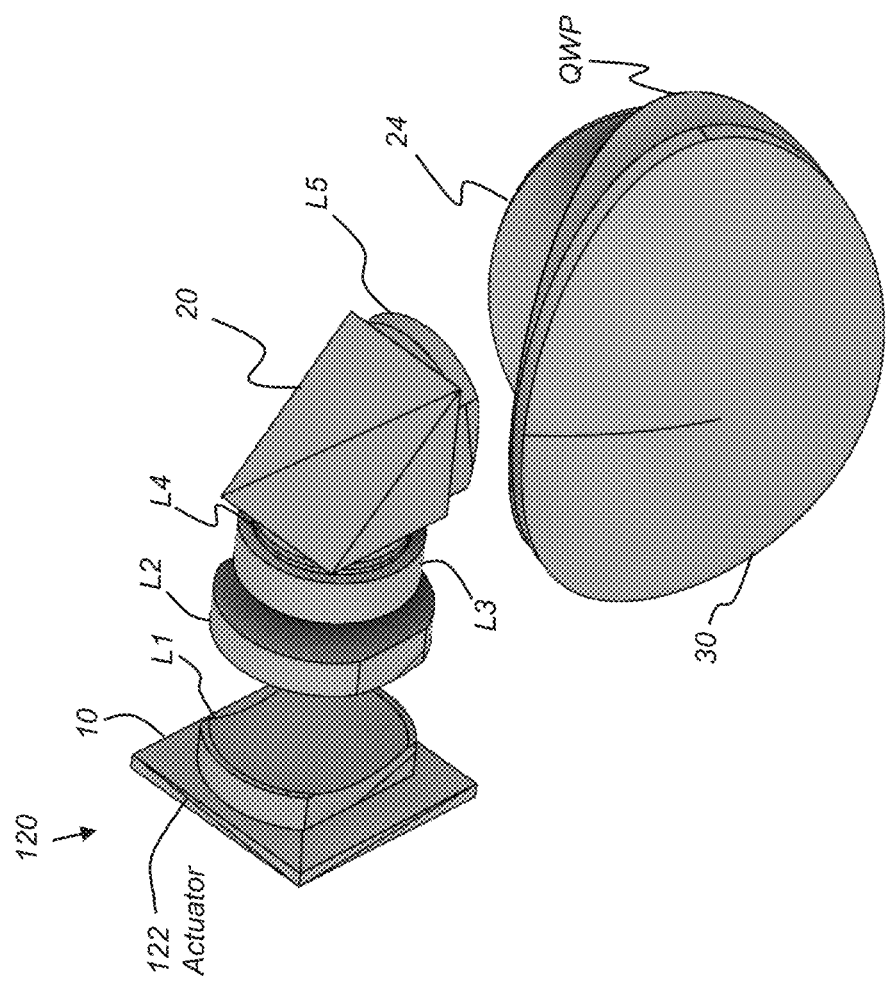
FIG. 11B is a perspective view that shows position of an actuator relative to the display and to corresponding optics.
Figure 11C:
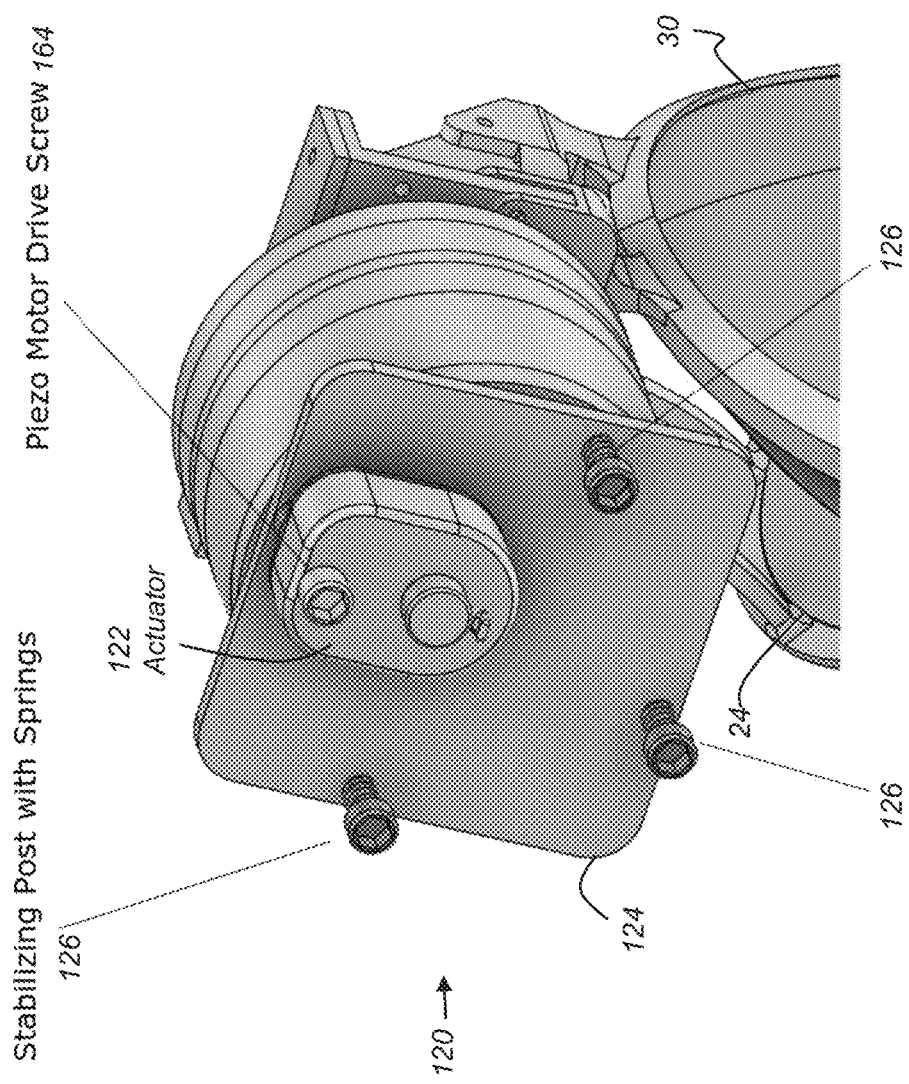
FIG. 11C is a perspective view from behind the display component, showing a piezoelectric actuator mounted to a plate behind the display.
Figure 11D:
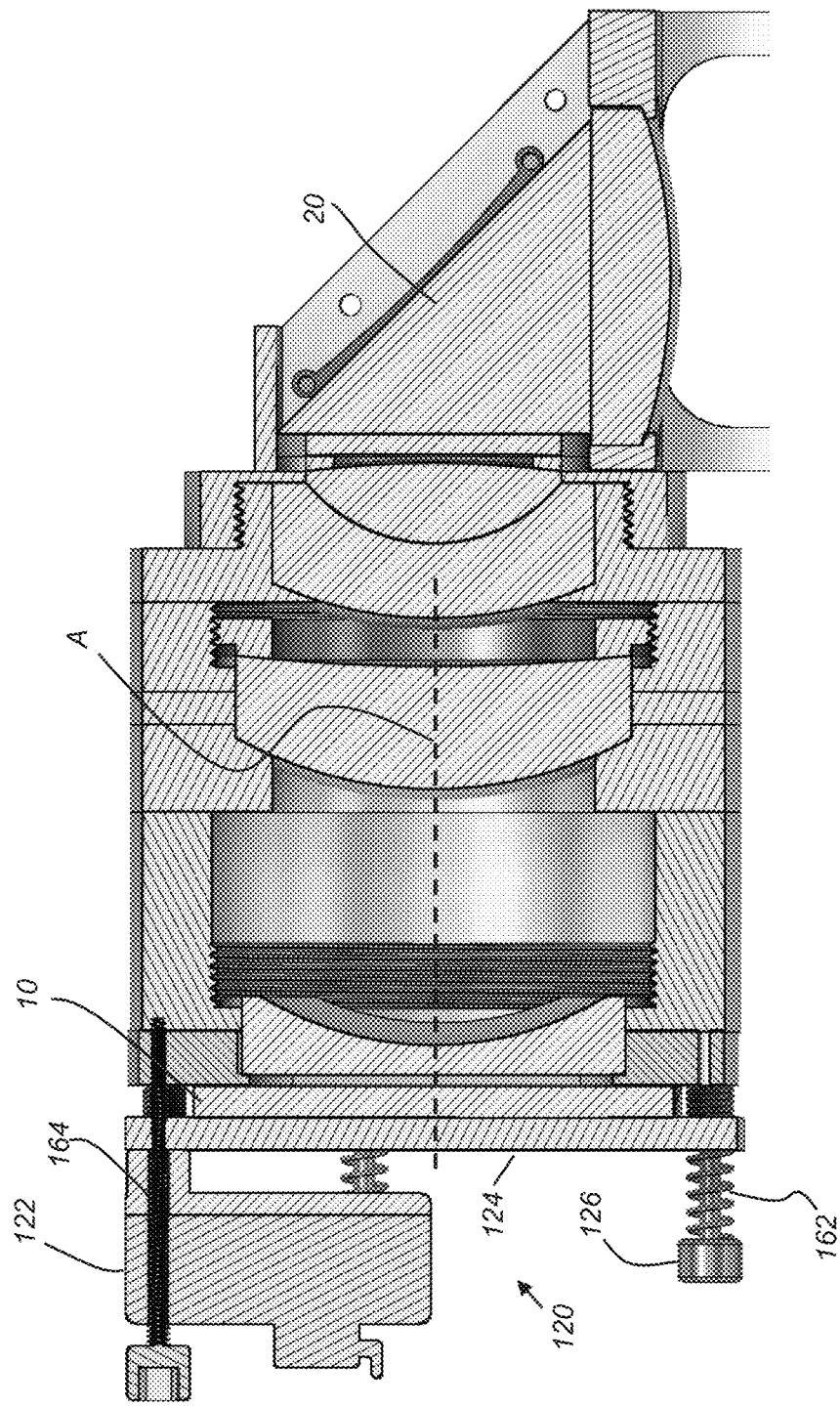
FIG. 11D is a side view showing components of a dynamic focus adjustment apparatus.

FIGS. 11B, 11C, and 11D show different views of relay optics with focal plane adjustment system 120. FIG. 11B is a perspective view that shows position of actuator 122 relative to image generator 10 and corresponding optics. FIG. 11C is a perspective view from behind image generator 10, showing a piezoelectric actuator 122 mounted to a stationary plate 124 behind image generator 10 (not visible in the view of FIG. 11C). Actuator 122, such as a piezoelectric actuator, translates image generator 10 along axis A, which extends orthogonally to the electroluminescent display component surface of image generator 10. FIG. 11D shows a side view of adjustment system 120 components. One or more stabilizing posts 126 has a screw and a compression spring 162 for maintaining image generator 10 in position along the optical path, so that movement of image generator 10 is constrained to the axial direction (axis A) during actuation.

Figure 12:
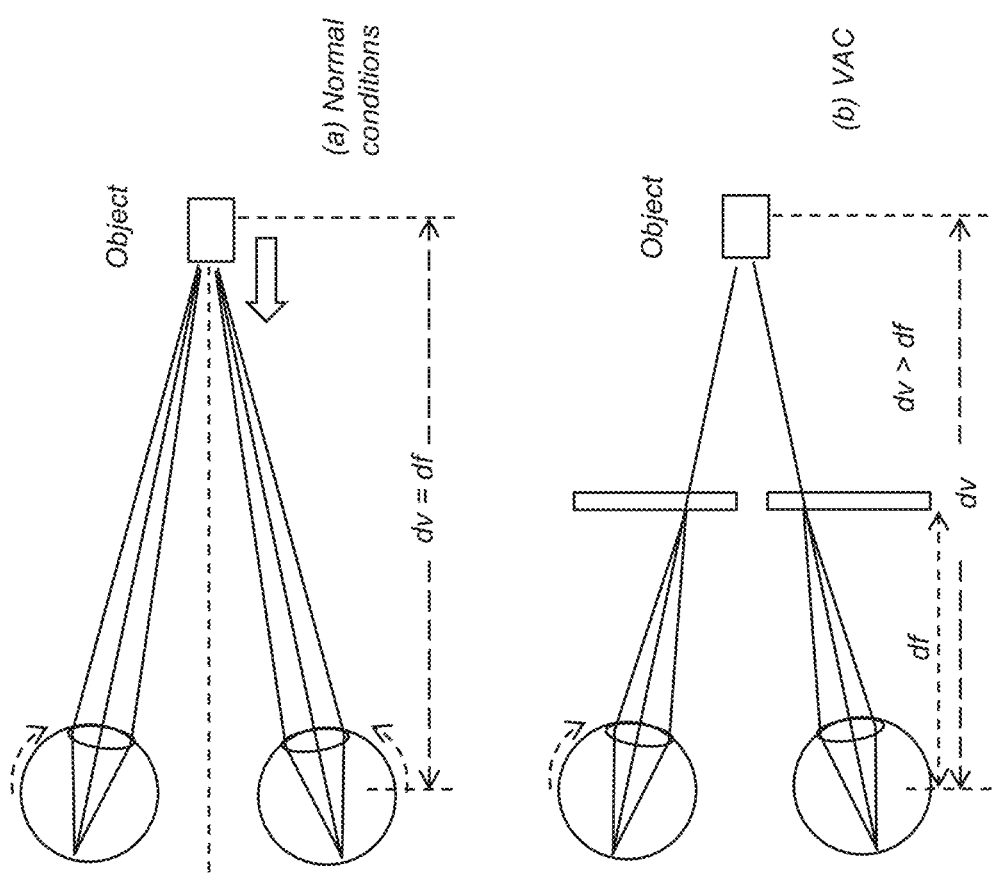
FIG. 12 is a schematic diagram showing visual accommodation and vergence-accommodation conflict.

One difficulty with the change in focal length relates to vergence-accommodation conflict, as shown in the schematic diagram of FIG. 12. Vergence-accommodation conflict (VAC) is a vision phenomenon that is familiar to developers of three-dimensional (3D) displays and virtual-reality (VR) display devices. Under real-world normal viewing conditions, where only the object scene is in view as shown in part (a) of FIG. 12, the viewer's eyes converge, rotating toward one another to focus on closer objects and, correspondingly, away from one another to focus on objects at further distance. Accommodation, as the process where the lenses of the eyes focus on a close or far away object, is consistent with convergence for normal viewing in the part (a) depiction and involves epipolar geometry of the HMD cameras and the wearer's eyes. Thus, accommodation and convergence can be considered to be coupled.

Focal plane adjustment system 120 (FIGS. 11A-D) also employs eye-tracking sensors and related data for determining when there is a discrepancy between focal planes for the object world FOV and the generated image content. The focal plane position for the generated image can be computed according to system optical geometry for the components defined hereinabove. Later adjustments to the geometry, executed by system logic for shifting focal plane position, can be recorded and used to recalculate focal plane position.

In FIG. 12 part (a), the viewer sees a real object, i.e., the viewer's eyes are verged on the real object and gaze lines from the viewer's eyes intersect at the real object. As the real object moves nearer the user, as indicated by the arrow, each eye rotates inward (i.e., converges) to stay verged on the real object. As the real object gets closer, the eye "accommodates" to the closer distance, through reflexive, automatic muscle movements, by adjusting the eye's lens to reduce the focal length. In this way, accommodation adjustment is achieved. Thus, under normal viewing conditions in the real world, the vergence distance ($d_v$) equals the accommodation distance ($d_f$).

In 3D displays and VR systems, however, these two processes can be decoupled, as shown in part (b) of FIG. 12. FIG. 12 shows an example conflict between vergence and accommodation that can occur with stereoscopic three-dimensional displays, in accordance with one or more embodiments. In this example, an observer is looking at the virtual object displayed on a 3D electronic display; however, the observer's eyes are verged on and gaze lines mapped from the observer's eyes intersect at the virtual object, which is at a greater distance from the observer's eyes than the image formed by the 3D electronic display. As the virtual object from the 3D electronic display is rendered to appear closer to the viewer, each eye again rotates inward to remain verged on the virtual object, but the focus distance of the image is not reduced; hence, the observer's eyes do not accommodate, as in part (a). Thus, instead of increasing the optical power to accommodate for the closer vergence depth, the eye maintains accommodation at a display distance associated with the 3D electronic display. Thus, the vergence depth (dv) often does not equal the focal length (df) for the human eye for objects displayed from 3D electronic displays. This discrepancy between vergence depth and focal length is referred to as "vergence accommodation conflict" or VAC. A user experiencing only vergence or only accommodation, and not both vergence and accommodation, can eventually experience some degree of fatigue, dizziness, discomfort, disorientation, and even nausea in some cases.

In order to compensate and correct VAC, the FIGS. 11A-D relay optics can adjust the relative position of intermediate image I to I', moving the virtual image focal plane more closely toward the real-world focal plane.

Model Controller

Embodiments in accordance with the present disclosure may be provided as an apparatus, method, computer program, hardware/software, state machine, firmware, and/or product. All of the systems and subsystems may exist, or portions of the systems and subsystems may exist to form the apparatus described in the present disclosure. Accordingly, one or more portions of the Applicants' solution may take the form of an entirely or partial hardware embodiment, a predominantly software embodiment (including firmware, resident software, micro-code, etc), or an embodiment combining software and hardware aspects in some combination that may all generally be referred to herein, without limitation, as a "unit," "module," or "system." Furthermore, one or more portions or functions for the present disclosure may take the form of a computer program product or products embodied in any tangible media of expression or storage having computer-usable program code embodied in or otherwise represented using the media. Any combination of one or more computer-usable or computer-readable media (or medium) may be utilized, including networked combinations that utilize remote processing components. For example, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Further, the intelligence in the main circuitry may be software, firmware, or hardware, and can be microcontroller based or included in a state machine. The disclosure may be a combination of the above intelligence and memory and this can exist in a central processing unit or a multiple of chips including a central graphics chip. The computer portion of the disclosure may also include a model view controller (MVC) as shown in FIG. 8, which is also called herein a "model controller."

Dithering

According to an embodiment of the present disclosure, dithering can be employed to modify and improve the visual experience of the viewer. Dithering can be effected, for example, by rapid in-plane vibration of a camera or image generator 10 using a piezoelectric actuator 122, as was described previously with respect to FIGS. 11A-D. Dithering, imparted to the displayed image content using synchronous, timed spatial displacement, can be a desirable solution for helping to mask or eliminate display-related artifacts, for example.

Dithering can also be used to enhance image resolution using Timed Spatial Displacement. Improved image resolution is goal, and holds promise for future use of AR/VR glasses in various applications, such as in critical use cases such as surgery visualization. In these applications, for example, detail visualization of fine layers and blood vessels can be critical to successful outcomes. Micro displays continue to mature, with pixel counts of 2 million in a single small device, with further improvements likely. These higher resolution displays impose steeply increased demands on system resources, including higher power and computation speed and complexity, for example.

The Applicants address this problem using dithering of display components. This solution can make higher resolution images available to users at a discounted power cost, which in turn can provide lighter, cooler running systems.

Increased pixel resolution is obtained by using the capability to shift image generator 10 in-plane, that is, in one or more (x-y plane) directions parallel to the emissive display surface of image generator 10, synchronously with corresponding changes in image data content. With respect to FIG. 11D, image generator 10 translation is in the x-y plane, orthogonal to axis A (conventionally considered the z-axis) for dithering to increase pixel resolution using synchronous, timed spatial displacement. Actuator 122 is configured to provide dithering using in-plane translation of image generator 10.

Figure 13:
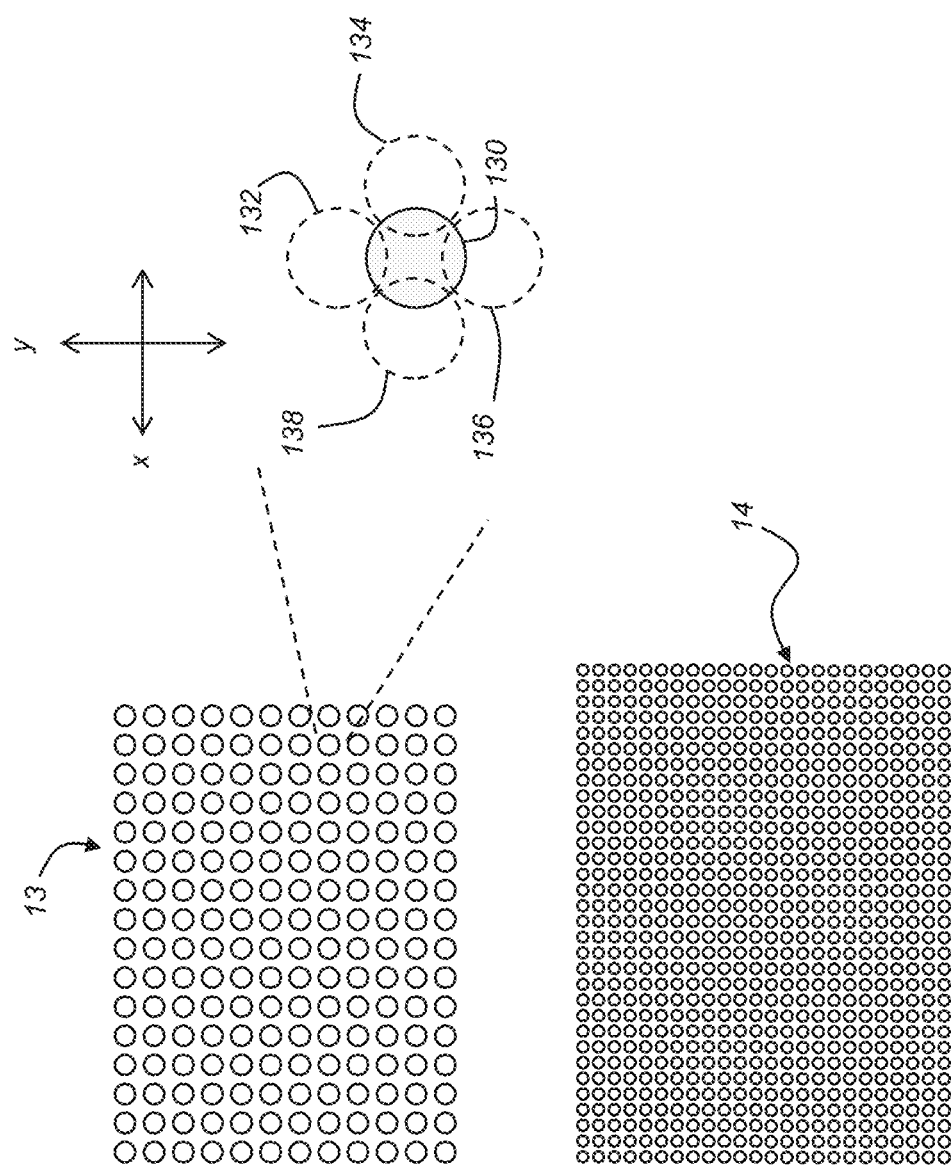
FIG. 13 is a schematic diagram that shows aspects of dithering geometry for enhanced image resolution.

As shown schematically in FIG. 13, multiplication of the image generator 10 resolution is accomplished by physically shifting an array 13 of pixels that form image generator display 10 in the x-y plane. The shift distance is a proper fraction of the pixel pitch. At right in FIG. 13 is represented a pixel 130 of array 13, shifted in the x-direction to pixel positions 134 and 138 and shifted in the y-direction to positions 132 and 136. Synchronous with the shift action is modulation of image data for each pixel 130 at its original position and at each shifted position 132, 134, 136, and 138. Thus, for example, the state of a pixel at its position 134 (e.g., brightness or color) can differ from its state at position 138, according to the image data content that is provided with the shift. With a half-pixel shift in each x- and y-direction, for example, the effective pixel count can be increased by at least 4 times. With a half-pixel shift only along one axis, such as only along the x or y axis as shown, the effective resolution along the axis parallel to the shift can be doubled. Overall, the power cost of nano scale piezo shifting is much lower than the cost to design and implement 4× the pixel count using a higher resolution image generator 10 element. An array 14 represents increased pixel resolution.

For the embodiment of FIG. 13, an image generator 10 was provided, having a 240 frames per second (fps) refresh rate. In terms of the piezoelectric actuation provided, each pixel element can be relocated at ½ the delta of the pixel element center-to-center distance in the array 13. This arrangement can provide 60 fps display at 4× the resolution of the original image generator 10.

By way of example, an embodiment of the present disclosure employs QNP-XY Series Two-Axis, CY Piezo Nanopositioners for image generator 10 dithering actuation.

A number of features allow piezoelectric dithering to provide enhanced resolution, including the following: (1) Adjustable travel range, such as from 100 um to 600 um, for example; (2) Long device lifetimes; (3) Superior positioning resolution; and (4) High stiffness and other factors.

A number of piezoelectric actuators provide the option of closed-loop feedback that allows sub-nanometer resolution and high linearity.

Dithering for increased resolution can utilize any of a number of movement patterns for in-plane displacement of pixels. Patterns for dithering the pixels in the display (or the displays) for increased resolution include transposing with rectilinear motion, curvilinear motion, or in a translational, rotational, periodic, or non-periodic motion, or any combination of the above. Also, the pattern could include a rectangle pattern which may increase the resolution by 4 times. Another alternative way to address the pixel movement is to have pixels that are approximately the same size as the non-emissive dark or "black" space between the pixels where the dithering translation of each pixel in a display is dithered to the next adjacent unused space existing between the pixels in the display.

For viewer comfort, a strap adjustment can be provided, allowing both a one-time fastener positioning adjustment and a flexible stretch band.

IPD Adjustment Apparatus

As noted previously, eye gaze tracking by components in headset 100 enables the system logic to determine adjustment of the inter-pupil distance (IPD) of each user. Pupillary distance (PD) or interpupillary distance (IPD) is the distance, measured in millimeters, between the centers of the pupils of the eyes. This measurement is different from person to person and typically ranges from 51.0 to 74.5 mm for women and 53 to 77 mm for men. IPD adjustment is beneficial and provides metrics that can show the amount of movement that would be required for an individual viewer. IPD sensing can be a one-time operation and can optionally be stored for each viewer who uses the headset. Embodiments of the present disclosure also enable headset 100 to provide continuous monitoring of viewer features related to IPD and to update currently IPD adjustment settings before, after, or during use of the display apparatus.

Benefits of IPD adjustment include reduced eyestrain, improved accuracy of displayed content and improved overall appearance of 3D imaging. To meet the need for IPD adjustment with minimum impact on weight, size, and usability of the wearable display, an embodiment of the present disclosure uses an IPD adjustment apparatus that is compact, lightweight, and offers a high degree of flexibility and accuracy without significant increase in parts count.

In addition, the apparatus can provide sufficient flexure with respect to multiple axes, allowing relatively unconstrained movement for IPD adjustment and alignment as well as for other positional adjustments to optical and sensing systems of the head-mounted display.

Figure 14:
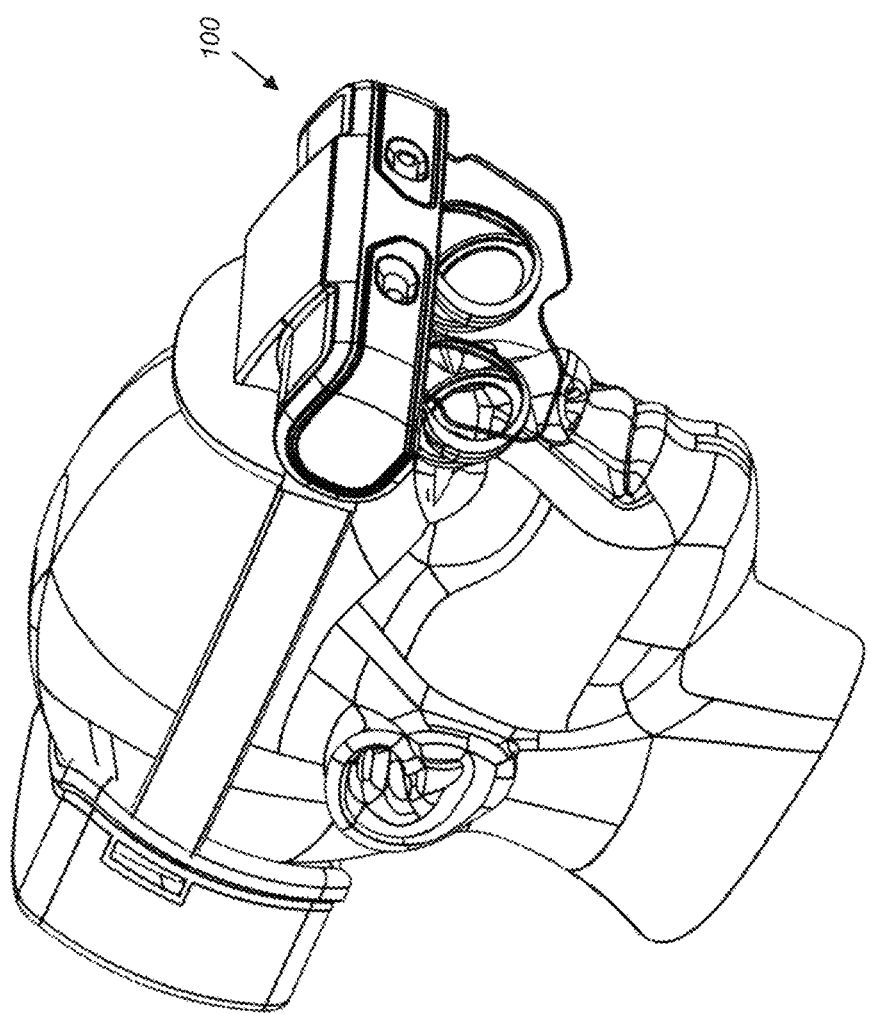
FIG. 14 is a perspective view that shows a wearable display headset that is configured to maintain IPD adjustment suited to the individual viewer.
Figure 15:
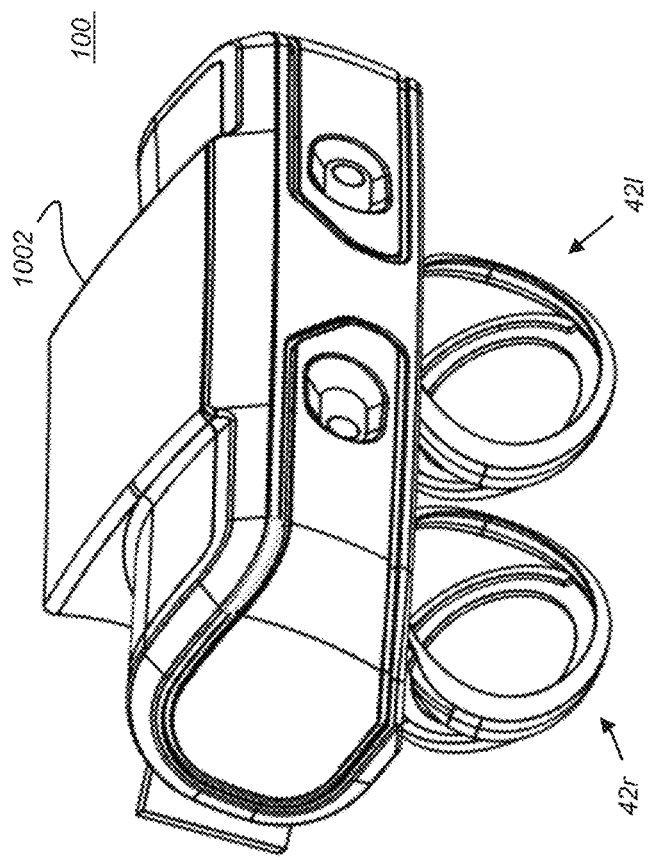
FIG. 15 shows portions of the headset removed from the viewer forehead.

FIG. 14 shows a perspective view of a wearable display headset 100 that is configured to maintain IPD adjustment suited to the individual viewer. FIG. 15 shows portions of headset 100 removed from the viewer forehead. The distance between right-eye optical system or module 42r and left-eye optical module 42l can be monitored and adjusted for each individual viewer, using the apparatus shown and described with reference to subsequent FIGS. 16-19.

Figure 16:
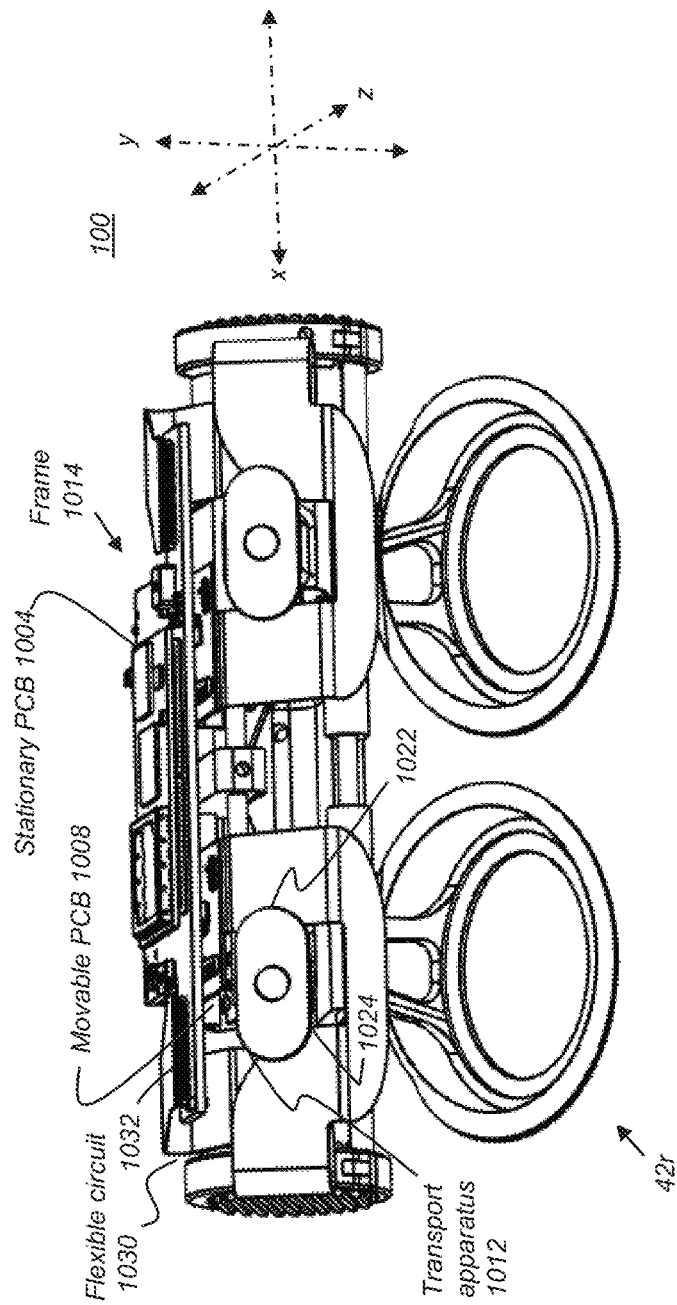
FIG. 16 shows internal components of the headset with an external cover removed.
Figure 17:
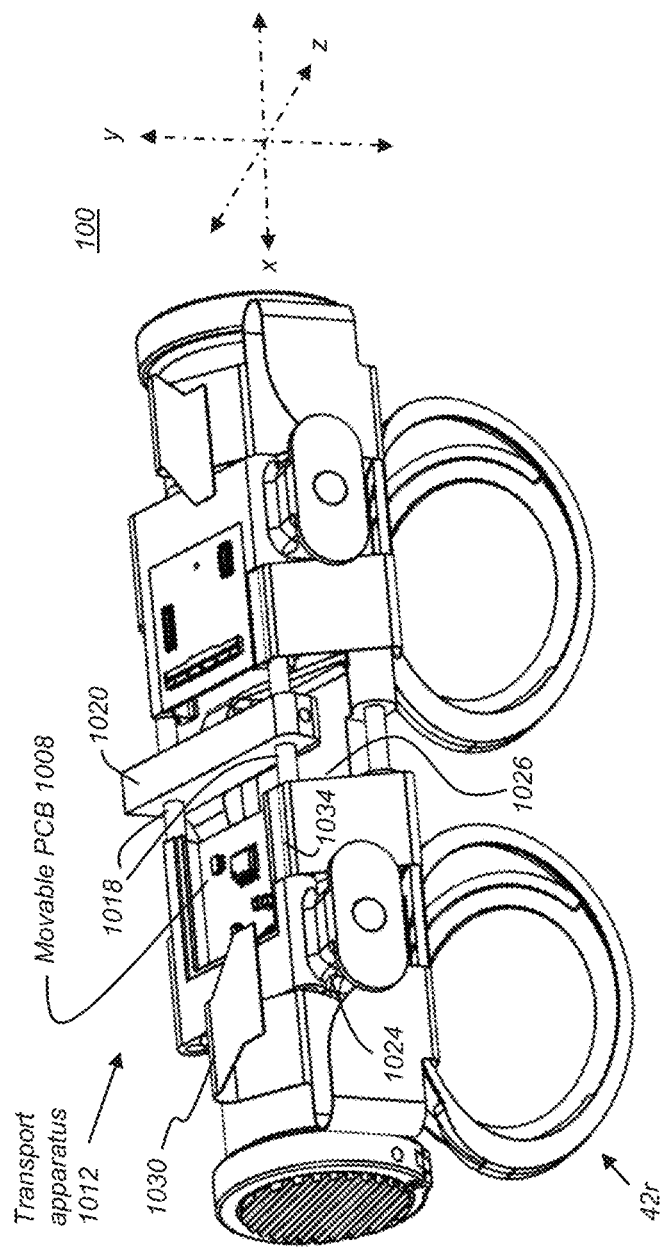
FIG. 17 shows internal components of the headset with additional components removed.

FIG. 16 shows internal components of headset 100 with an external cover 1002 removed. A stationary printed circuit board (PCB) 1004 is mounted to a frame 1014 of headset 100, so that stationary circuit board 1004 does not move relative to frame 1014. To provide the movement of optical and sensing components in at least the x-axis direction for IPD adjustment, a movable printed circuit board 1008, shown more clearly in FIG. 17, is coupled to a transport apparatus 1012. Each optical module 42l, 42r can have a movable printed circuit board 1008, as shown generally for the right-eye optical module 42r in FIG. 16 and following. Transport apparatus 1012 also conveys the optical apparatus for image generation and presentation and, optionally, a camera 1024, shown as mounted behind a camera shroud 1022 in the FIGS. 16, 17 embodiment. It is important that the IPD adjustment be correct for each user, and also that the dual cameras remain centered over the user's pupil for the best real-world alignment.

With the arrangement thus described, stationary and movable components are provided the needed connection to each other for proper operation and communication and, at the same time, have the needed separation to allow adjustment and positioning of components associated with particular vision characteristics of the viewer.

In order to better understand benefits and structural aspects of headset 100 design, it is useful to identify particular features that make IPD adjustment and fine-tuning possible. FIG. 17 shows further details of the internal component arrangement of headset 100 according to an embodiment of the present disclosure, with stationary circuit board 1004 (FIG. 16) removed. Considering the optical arrangement for right-eye viewing, movable circuit board 1008 is configured for conveyance along a pair of rails 1018. Drive energy is provided by energizing an actuator 1026, which can be a small motor or other type of rotary or linear actuator. Actuator 1026 can be piezoelectric, for example. Rails 1018 extend along the x-axis from a stationary center support 1020.

In order to provide ongoing connection between movable and stationary components at each incremental position of the optical system, an embodiment of the present disclosure employs a flexible circuit 1030 that has at least a first connector 1032 to stationary circuit board 1004 (as shown in FIG. 16) and a second connector 1034 to movable circuit board 1008 (as shown in FIG. 17).

Figure 18C:
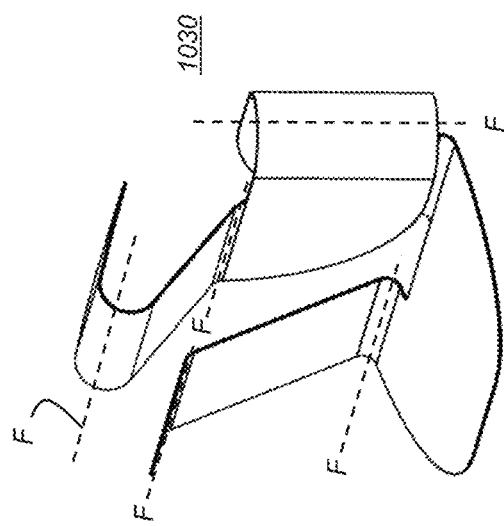
FIGS. 18A, 18B, and 18C show a basic form of flexible circuit as a type of ribbon cable having printed circuit traces as well as connectors.
Figure 18A:
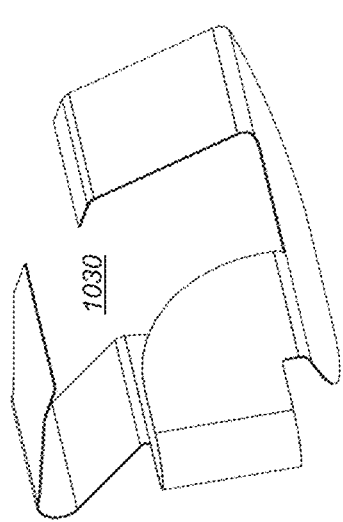
Figure 18B:
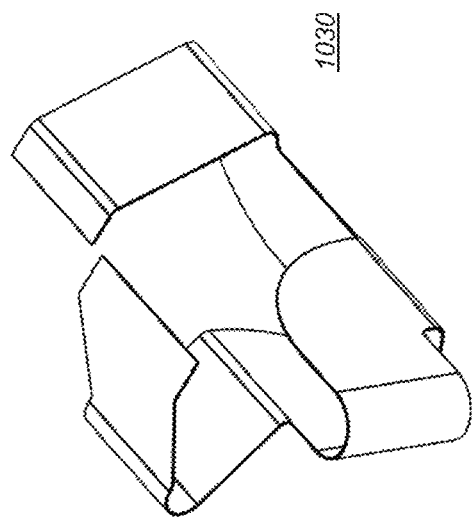

The perspective views of FIGS. 18A, 18B, and 18C show a basic form of flexible circuit 1030 used in each left- and right-eye optical system or module 42l, 42r as a type of ribbon cable, having printed circuit traces as well as connectors, and further mounting any number of auxiliary components for signal conditioning. As shown in FIG. 18C, flexible circuit 1030 can provide an arrangement of bends, curves, or folds F, respectively parallel and orthogonal, that allow circuit flexure for a range of movement between stationary and movable components. Using the configuration shown, two or more of the folds F can be mutually orthogonal to each other, for example. In addition to circuit traces for signal routing, flexible circuit 1030 can also include one or more electronic components mounted thereon, such as discrete components mounted on areas of the surface for executing logic control, signal conditioning, and other functions as well as for providing or conditioning power, grounding, and drive signals, for example. The use of flexible circuit board materials, such as polyimide films and similar flexible substrates for example, can help to support smooth, continuous, and unobstructed movement of the corresponding subassemblies of the headset 100 with added advantages of reduced connector count and size. Circuit substrates used for flexible connection can also allow high circuit densities, thus reducing space requirements for improved compactness.

Figure 19:
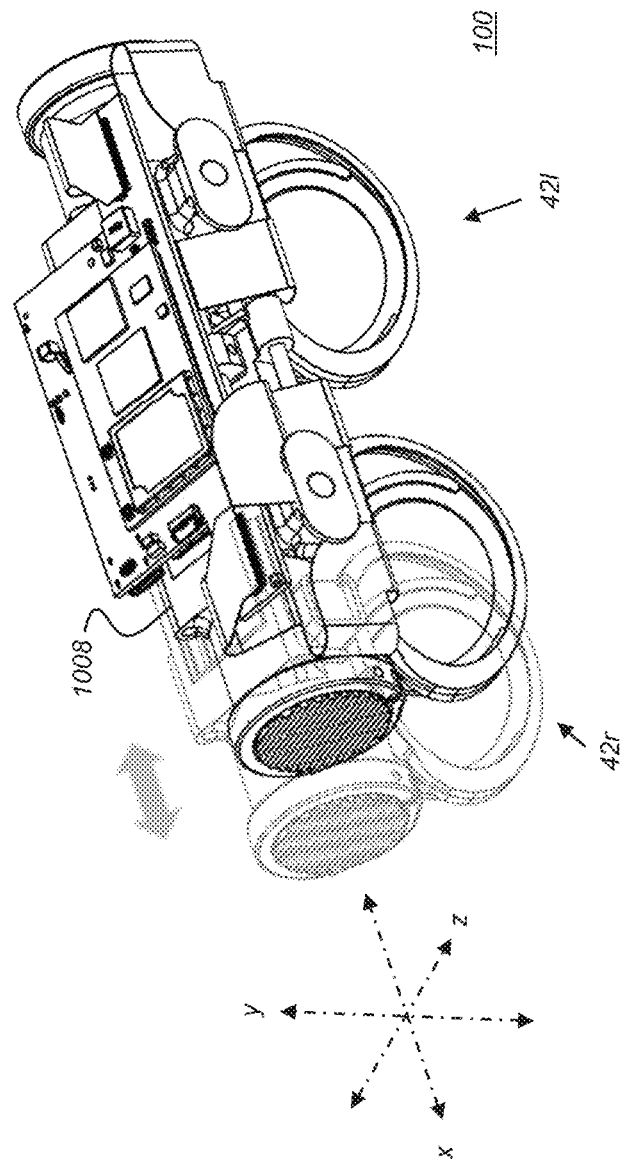
FIG. 19 shows a perspective view of an embodiment in which only the right-eye optical system is shifted; the left-eye optical system is stationary with respect to the frame.

FIG. 19 shows a perspective view of an embodiment in which only the right-eye optical module 42r is shifted; the left-eye optical module 42l is stationary with respect to the frame. It should be noted that either or both of the left- and right-eye optical systems can be shifted in position along the x-axis in order to adjust inter-pupil distance. The exact functions of stationary and movable components can vary from those indicated herein, which are given for the sake of example only, and not by way of limitation.

In addition to supporting x-axis movement, the use of flexible circuit 1030 also provides a useful mechanism that allows movement of system components along or about other axes, such as for adjustment of focus or other optical adjustment.

Figure 20:
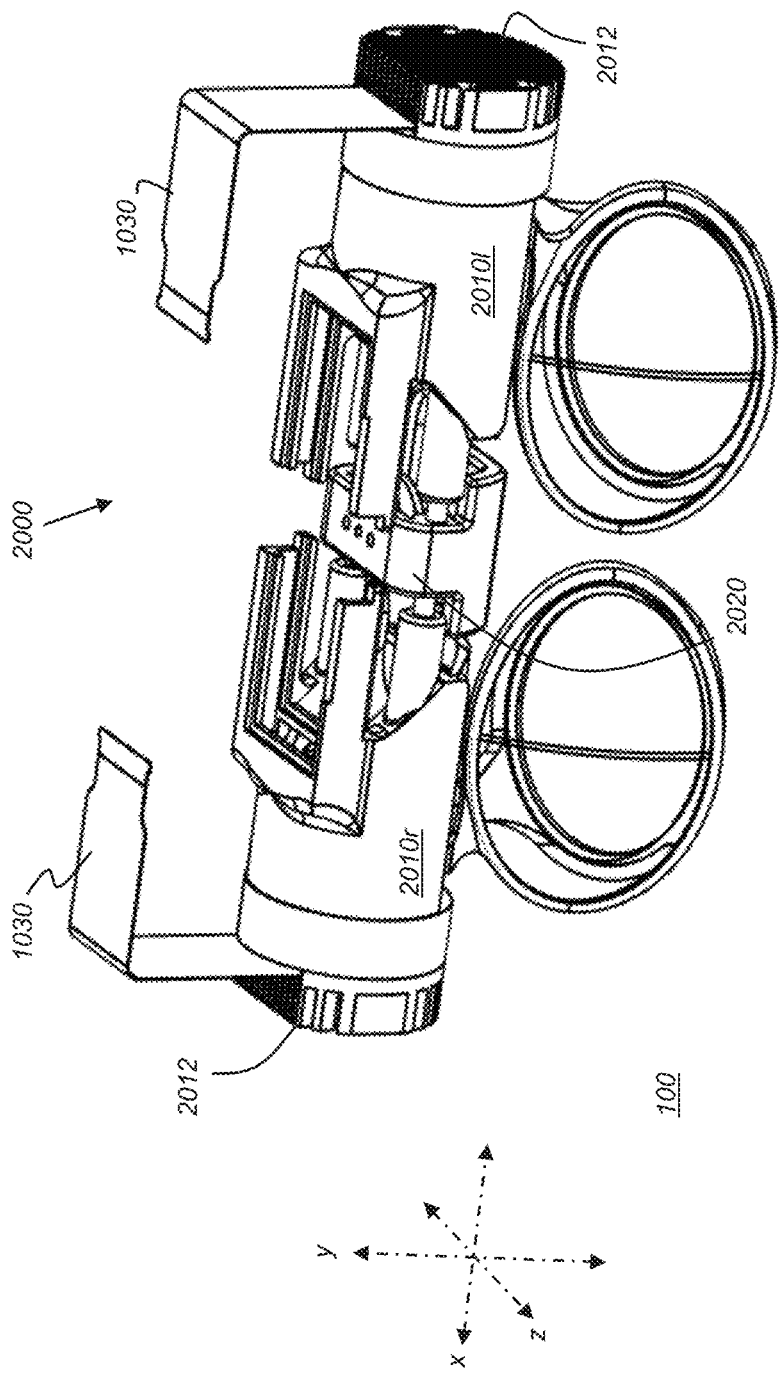
FIG. 20 is a perspective view that shows headset optics configured for IPD adjustment according to an embodiment of the present disclosure.

Adjustment of the IPD distance can be performed by the transport apparatus in a number of ways, including manual adjustment and automatic adjustment, based on identifying viewer eye position. FIG. 20 is a perspective view that shows headset optics configured for IPD adjustment according to an embodiment of the present disclosure that employs, as a type of transport apparatus, an adjustment apparatus 2000 using cam adjustment. Headset 100 is formed with two barrels 2010*l* and 2010*r* for encasing right-eye and left-eye optics. Each barrel 2010*l*, 2010*r* has a corresponding flexible circuit 1030 and includes a heatsink 2012. A center support 2020 houses the cam mechanism for controlling barrel 2010*l*/2010*r* movement.

Figure 21A:
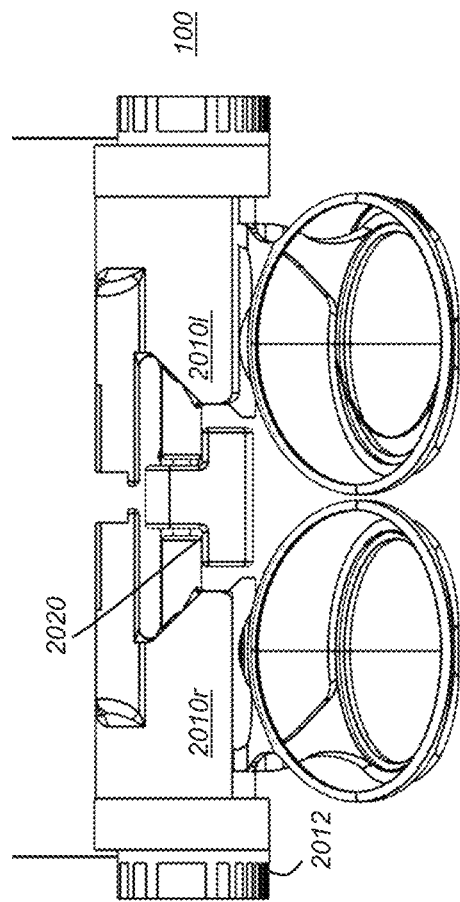
FIG. 21A shows a front view of the headset optics of FIG. 20 with a minimum IPD setting.
Figure 21B:
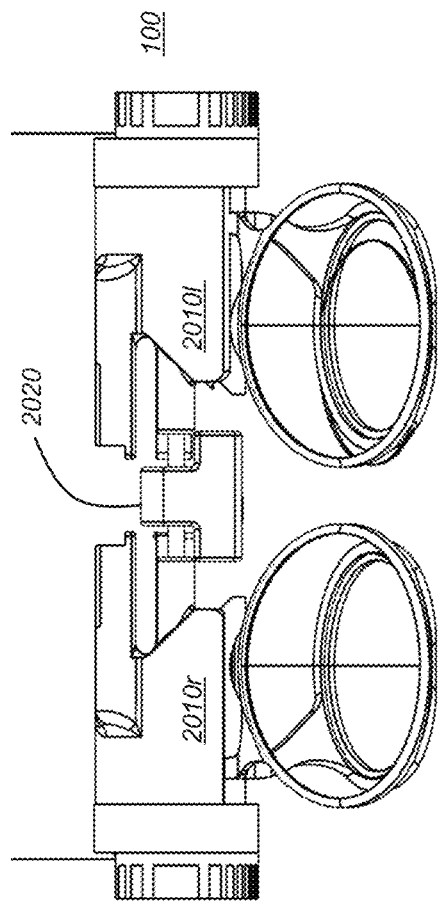
FIG. 21B shows a front view of the headset optics of FIG. 20 with a maximum IPD setting.

FIG. 21A shows a front view of the headset 100 optics of FIG. 20 with a minimum IPD setting. FIG. 21B shows a front view of the headset optics of FIG. 20 with a maximum IPD setting. In the embodiment shown, both the left-eye and right-eye optical systems move with respect to center support 2020 and its actuator and supporting stationary circuit components.

Figure 22:
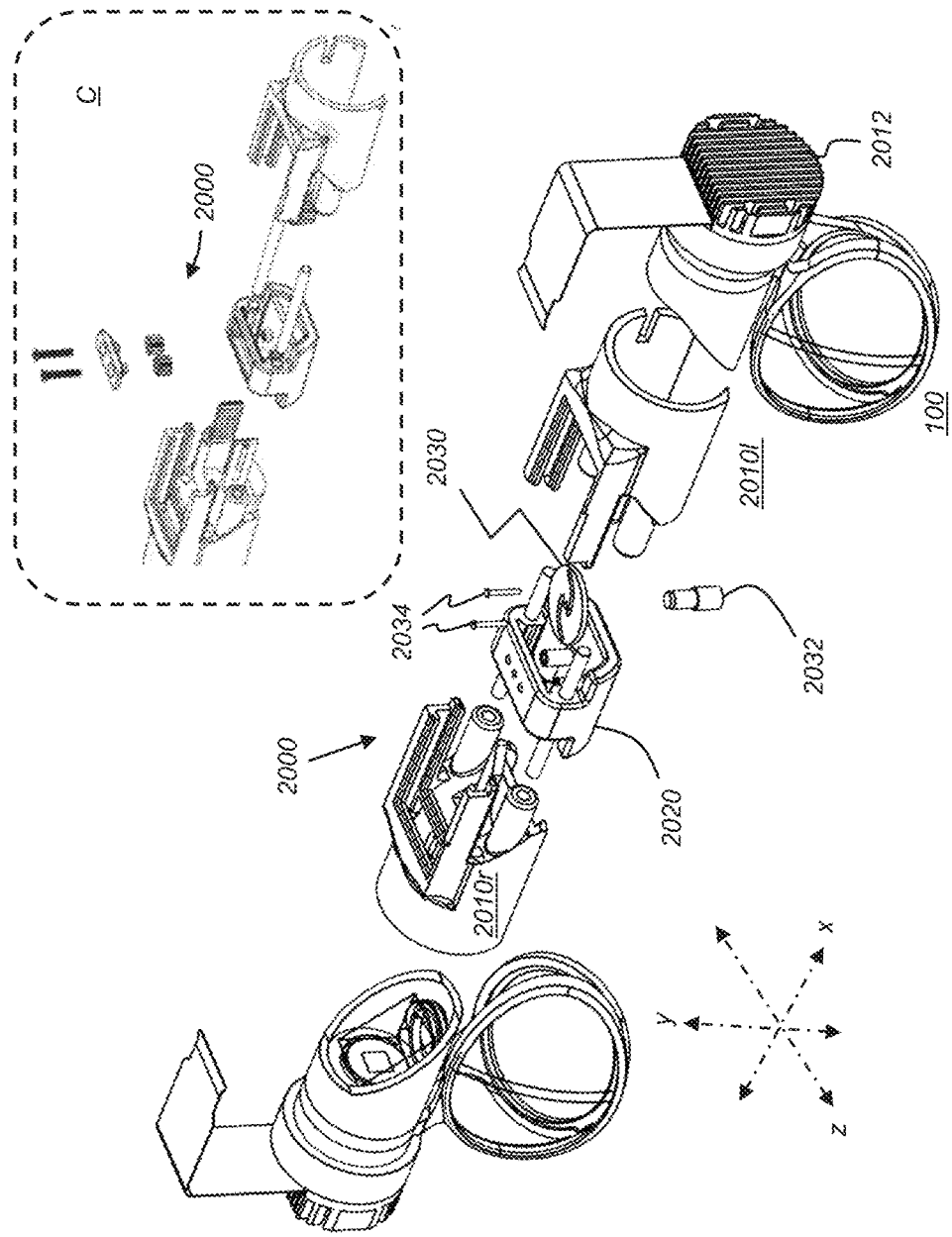
FIG. 22 is an exploded view showing the relative position of an IPD adjustment apparatus with respect to headset optics.

FIG. 22 is an exploded view showing the relative position of a cam-based IPD adjustment apparatus 2000 with respect to headset 100 optics. Cam 22 rotates under control of an IPD actuator 2032, which can be a motor. Actuator 2032 can be energized to rotate cam 2030. This rotation sets the relative distance of pins 2034 that couple cam 2030 to each barrel 2010*l*, 2010*r*. An inset C shows an example of an alternate embodiment employing a rack-and-pinion adjustment apparatus 2000, that similarly employs a rotational actuator (not shown). Rack-and-pinion coupling is familiar to those skilled in the mechanical motion art.

Figure 23A:
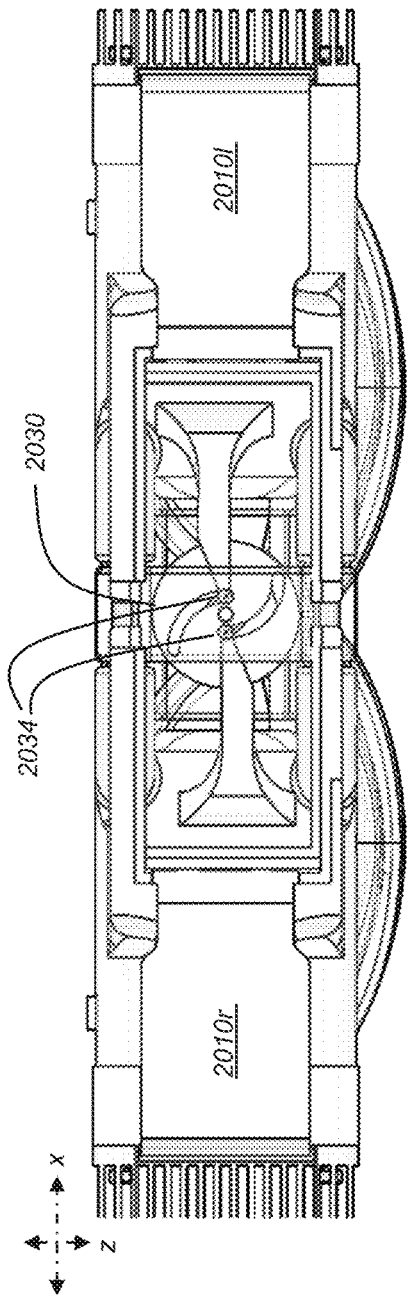
FIGS. 23A and 23B show positions of a cam apparatus for IPD adjustment.
Figure 23B:
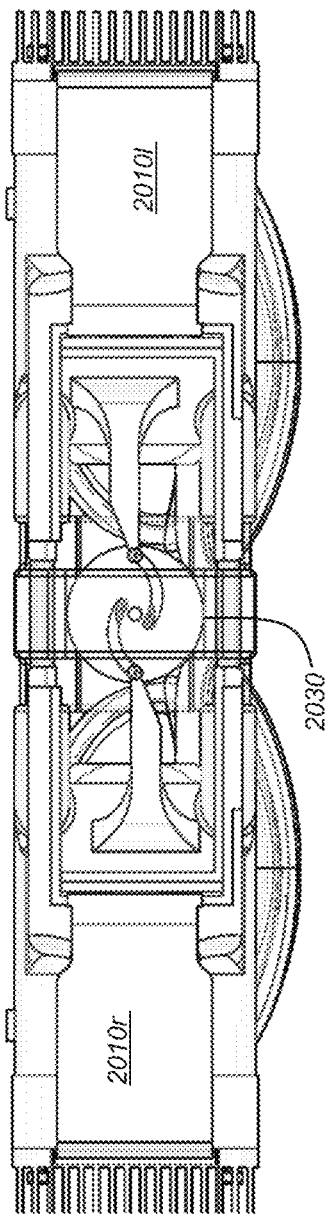

FIGS. 23A and 23B show a top view with cam 2030 apparatus at extreme IPD adjustment positions.

Figure 24A:
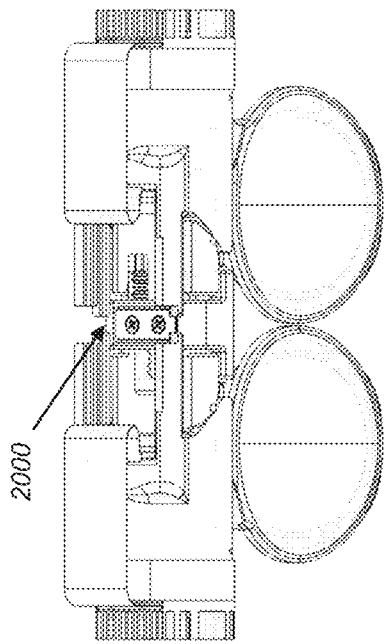
FIGS. 24A and 24B show minimum and maximum positions for IPD adjustment according to an alternate embodiment of the present disclosure.
Figure 24B:
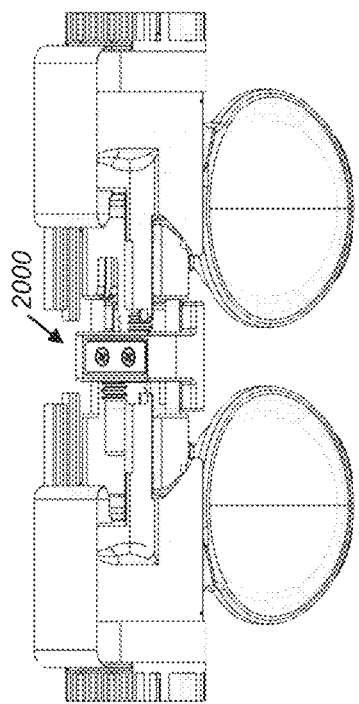

FIGS. 24A and 24B show minimum and maximum settings for IPD adjustment apparatus 2000 for an alternate embodiment using rack-and-pinion actuation for IPD adjustment.

In one embodiment, the eye-tracking subsystem in the headset can identify the center of a person's cornea upon startup, and then automatically, through the model controller and IPD actuator, move the wearable display headset to the correct IPD adjustment.

The invention has been described in detail with particular reference to a presently preferred embodiment, but it will be understood that variations and modifications can be effected within the spirit and scope of the disclosure. The presently disclosed embodiments are therefore considered in all respects to be illustrative and not restrictive. The scope of the invention is indicated by any appended claims, and all changes that come within the meaning and range of equivalents thereof are intended to be embraced therein.

What is claimed is:

1. An augmented/extended reality (AXR) wearable display apparatus comprising:
a headset support frame;
an optical system including a left-eye optical module and a right-eye optical module, each optical module including an image generator, a partially transmissive curved mirror positioned in front of a viewer eye, and an optical image relay configured to conjugate a two-dimensional (2D) image formed from the image generator to a curved focal surface of the partially transmissive curved mirror and including a prism having a folding surface extending between an input surface and output surface and configured for folding the optical path for light generated by the image generator, and an aperture stop for the optical image relay is formed within the prism; and
an inter-pupil distance (IPD) adjustment system including:
a stationary center support mounted to the headset support frame;
a left transport apparatus coupled to the left-eye optical module for supporting the left-eye optical module from the stationary center support;
a right transport apparatus coupled to the right-eye optical module for supporting the right-eye optical module from the stationary center support;
a plurality of rails coupled to the stationary center support, the left transport apparatus, and the right transport apparatus such that such that the left transport apparatus and the right transport apparatuses are slidable along the plurality of rails; and
an actuator configured to selectively move the left transport apparatus and the right transport apparatus along the plurality of rails to adjust the inter-pupil spacing between the left-eye optical module and the right-eye optical module.

2. The AXR wearable display apparatus of claim 1, further comprising a stationary circuit board mounted to the stationary center support.

3. The AXR wearable display apparatus of claim 2, further comprising:
a first flexible circuit coupled to the stationary circuit board and to a left-eye image generator of the left-eye optical module; and
a second flexible circuit coupled to the stationary circuit board and to a right-eye image generator of the right-eye optical module.

4. The AXR wearable display apparatus of claim 3, wherein the first and second flexible circuits include ribbon cables.

5. The AXR wearable display apparatus of claim 1, wherein the actuator includes a rack-and-pinion coupling.

6. The AXR wearable display apparatus of claim 5, wherein the actuator is energizable to selectively move the left transport apparatus and the right transport apparatus away from or toward the stationary circuit board.

7. The AXR wearable display apparatus of claim 1, wherein the IPD adjustment system includes an eyetracking system to provide a signal indicative of a pupil position of the viewer relative to the left-eye optical module or the right-eye optical module.

8. An IPD adjustment system for use with an AXR wearable display apparatus including a headset support frame and an optical system including a left-eye optical module and a right-eye optical module, each optical module including an image generator, a partially transmissive curved mirror positioned in front of a viewer eye, and an optical image relay configured to conjugate a two-dimensional (2D) image formed from the image generator to a curved focal surface of the partially transmissive curved mirror and including a prism having a folding surface extending between an input surface and output surface and configured for folding the optical path for light generated by the image generator, and an aperture stop for the optical image relay is formed within the prism, the IPD adjustment system comprising:

a stationary center support mounted to the headset support frame;

a left transport apparatus coupled to the left-eye optical module for supporting the left-eye optical module from the stationary center support;

a right transport apparatus coupled to the right-eye optical module for supporting the right-eye optical module from the stationary center support;

a plurality of rails coupled to the stationary center support, the left transport apparatus, and the right transport apparatus such that such that the left transport apparatus and the right transport apparatuses are slidable along the plurality of rails; and an actuator configured to selectively move the left transport apparatus and the right transport apparatus along the plurality of rails to adjust the inter-pupil spacing between the left-eye optical module and the right-eye optical module.

9. The IPD adjustment system of claim 8, further comprising a stationary circuit board mounted to the stationary center support.

10. The IPD adjustment system of claim 9, further comprising:

a first flexible circuit coupled to the stationary circuit board and to a left-eye image generator of the left-eye optical module; and a second flexible circuit coupled to the stationary circuit board and to a right-eye image generator of the right-eye optical module.

11. The IPD adjustment system of claim 10, wherein the first and second flexible circuits include ribbon cables.

12. The IPD adjustment system of claim 8, wherein the actuator includes a rack-and-pinion coupling.

13. The IPD adjustment system of claim 12, wherein the actuator is energizable to selectively move the left transport apparatus and the right transport apparatus away from or toward the stationary circuit board.

14. The IPD adjustment system of claim 8, further comprising:

an eyetracking system to provide a signal indicative of a pupil position of the viewer relative to the left-eye optical module or the right-eye optical module.

15. A method of assembling an AXR wearable display apparatus, comprising:

providing a headset support frame;

providing an optical system including a left-eye optical module and a right-eye optical module, each optical module including an image generator, a partially transmissive curved mirror positioned in front of a viewer eye, and an optical image relay configured to conjugate a two-dimensional (2D) image formed from the image generator to a curved focal surface of the partially transmissive curved mirror and including a prism having a folding surface extending between an input surface and output surface and configured for folding the optical path for light generated by the image generator, and an aperture stop for the optical image relay is formed within the prism; and coupling an IPD adjustment system to the headset support frame and the optical system by:

mounting a stationary center support to the headset support frame;

coupling a left transport apparatus to the left-eye optical module for supporting the left-eye optical module from the stationary center support;

coupling a right transport apparatus to the right-eye optical module for supporting the right-eye optical module from the stationary center support;

coupling a plurality of rails to the stationary center support, the left transport apparatus, and the right transport apparatus such that such that the left transport apparatus and the right transport apparatuses are slidable along the plurality of rails; and coupling an actuator to the left transport apparatus and the right transport apparatus to selectively move the left transport apparatus and the right transport apparatus along the plurality of rails to adjust the inter-pupil spacing between the left-eye optical module and the right-eye optical module.

16. The method of claim 15, further comprising mounting a stationary circuit board to the stationary center support.

17. The method of claim 16, further comprising:

coupling a first flexible circuit to the stationary circuit board and to a left-eye image generator of the left-eye optical module; and coupling a second flexible circuit coupled to the stationary circuit board and to a right-eye image generator of the right-eye optical module.

18. The method of claim 17, wherein the first and second flexible circuits include ribbon cables.

19. The method of claim 15, wherein the actuator includes a rack-and-pinion coupling and is energizable to selectively move the left transport apparatus and the right transport apparatus away from or toward the stationary circuit board.

20. The method of claim 15, further comprising:

providing an eyetracking system to provide a signal indicative of a pupil position of the viewer relative to the left-eye optical module or the right-eye optical module.

* * * * *